No. 884,837. PATENTED APR. 14, 1908.
E. C. MORRIS & L. J. HALL.
MACHINE FOR STAMPING AND SEALING MAIL MATTER.
APPLICATION FILED SEPT. 19, 1898. RENEWED JAN. 16, 1903.
11 SHEETS—SHEET 6.
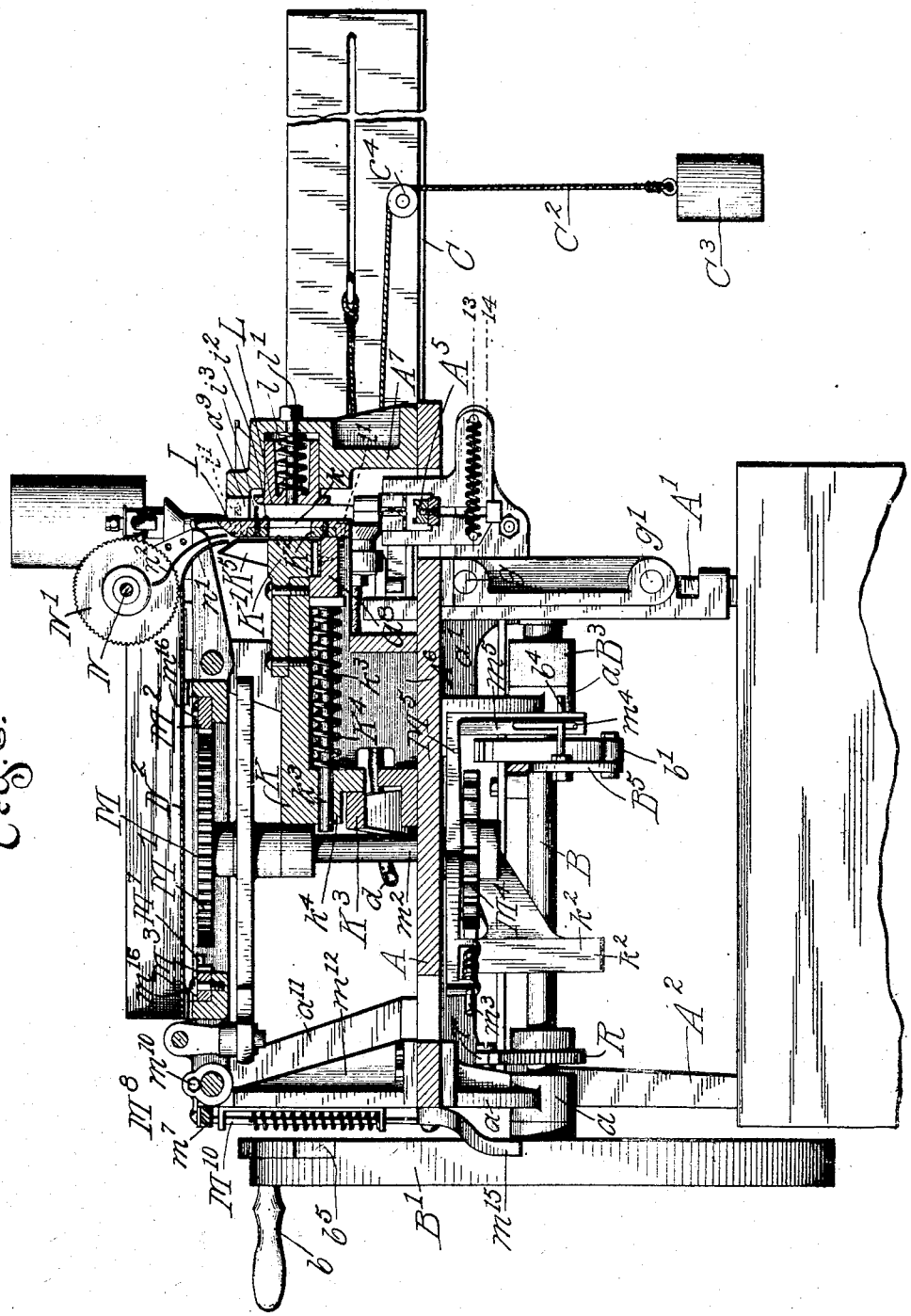

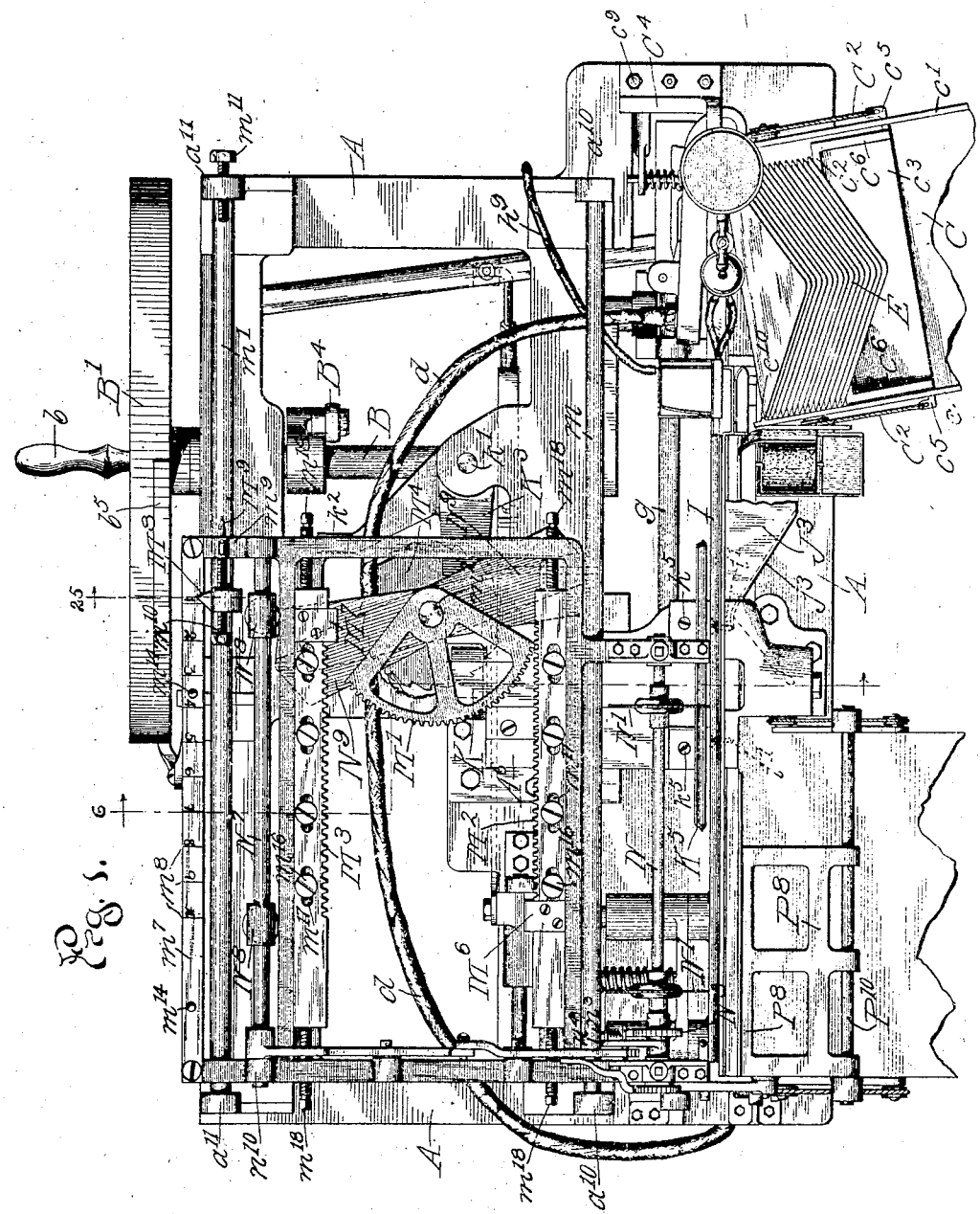

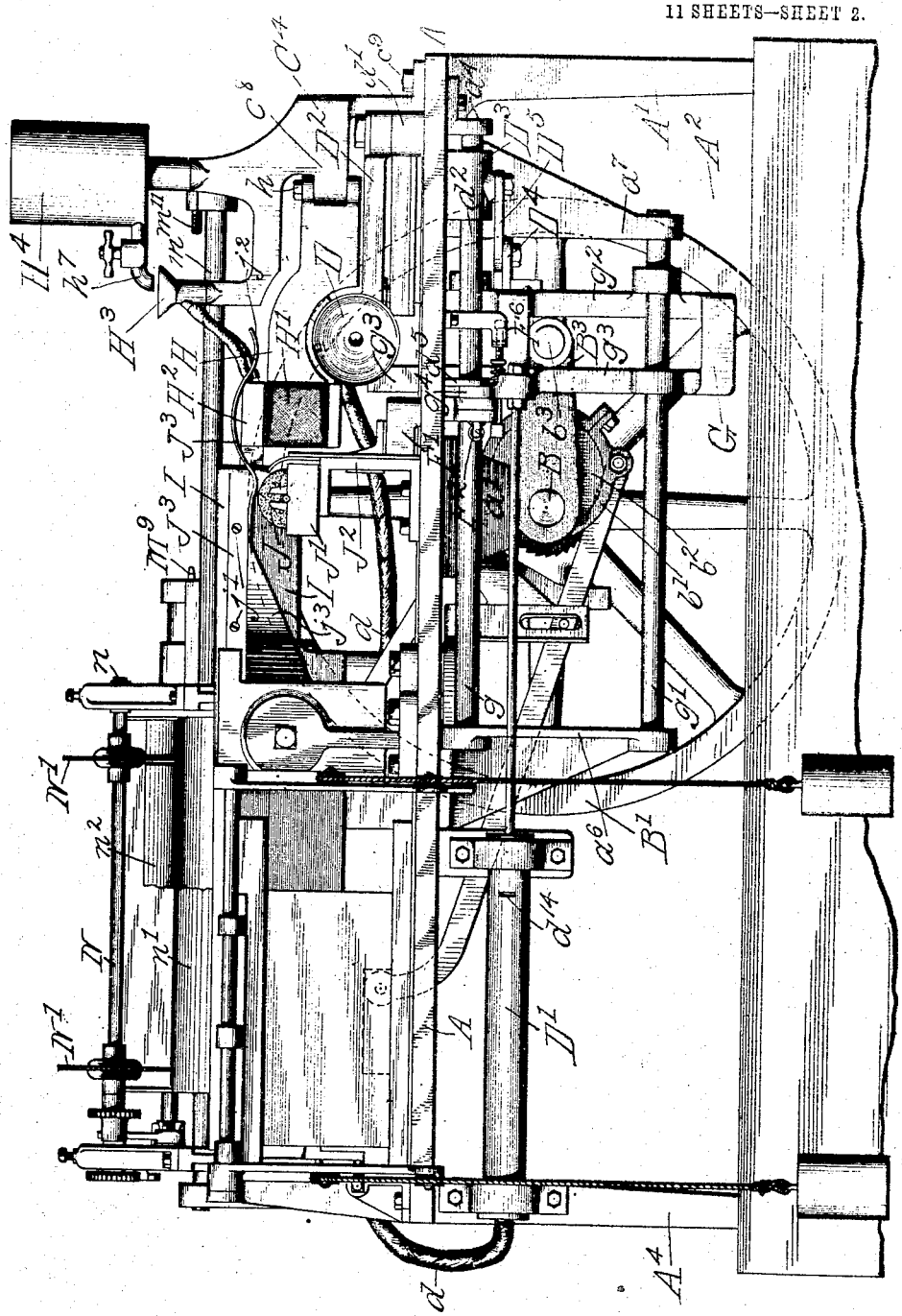

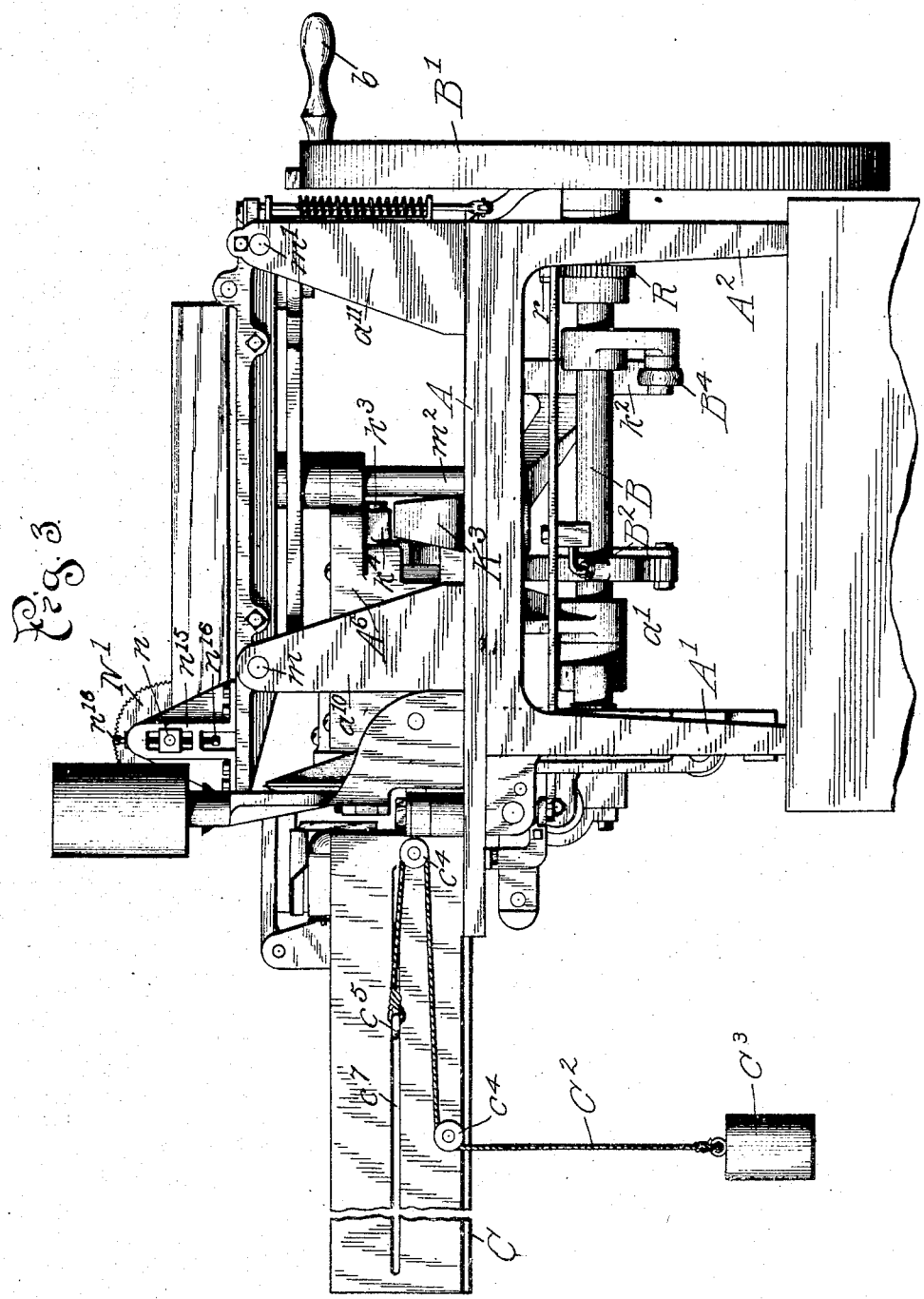

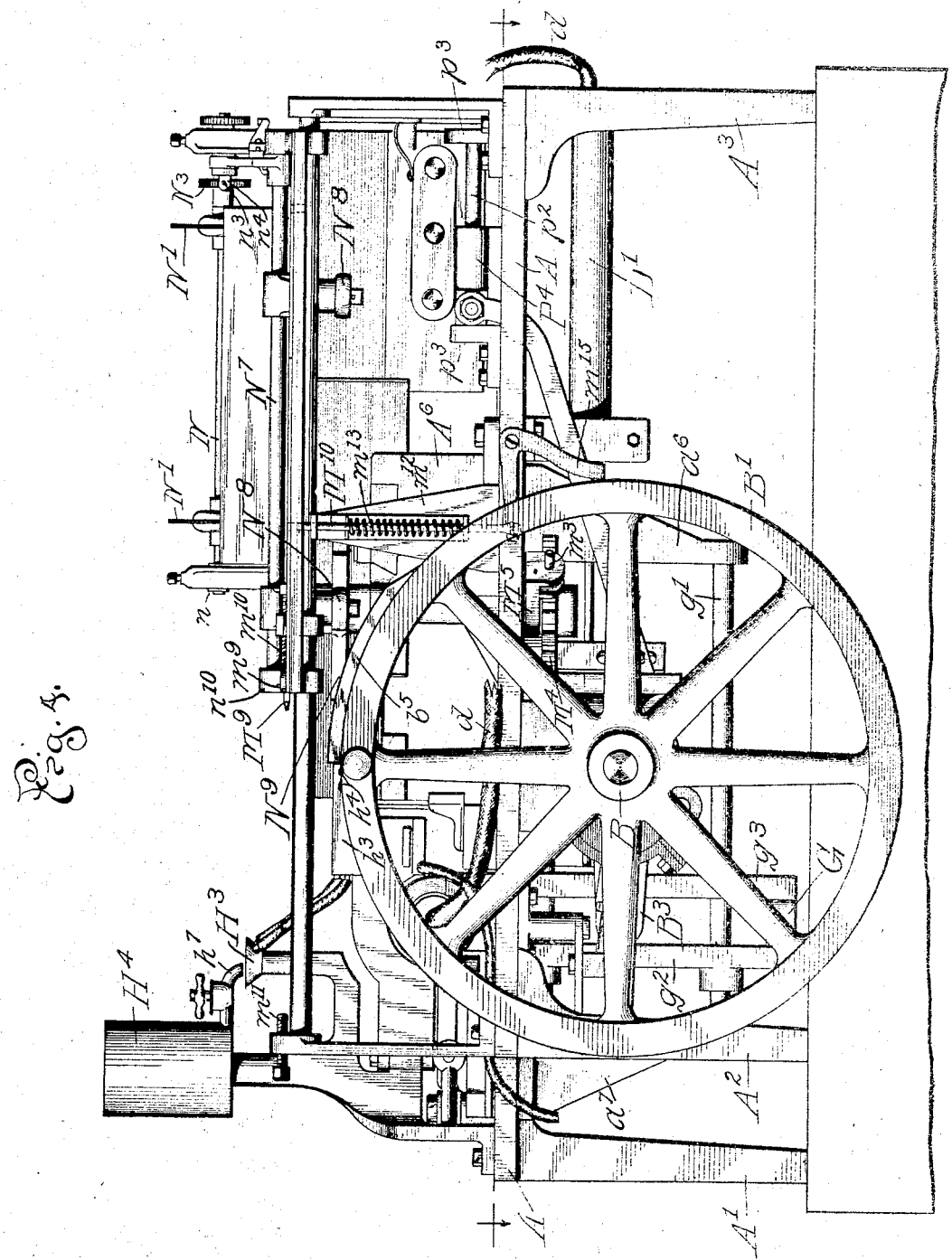

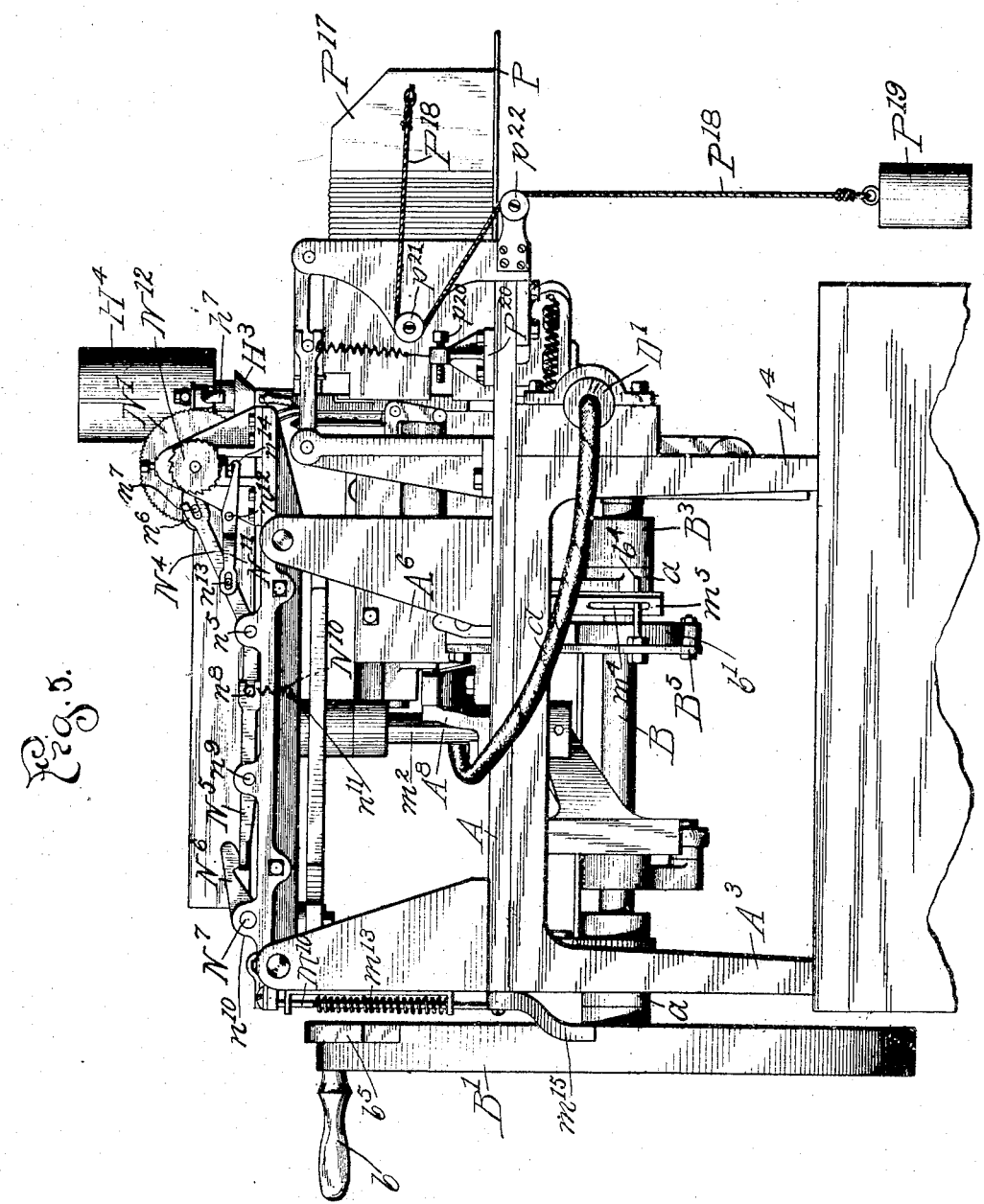

No. 884,837. PATENTED APR. 14, 1908.
E. C. MORRIS & L. J. HALL.
MACHINE FOR STAMPING AND SEALING MAIL MATTER.
APPLICATION FILED SEPT. 19, 1898. RENEWED JAN. 16, 1903.
11 SHEETS—SHEET 7.
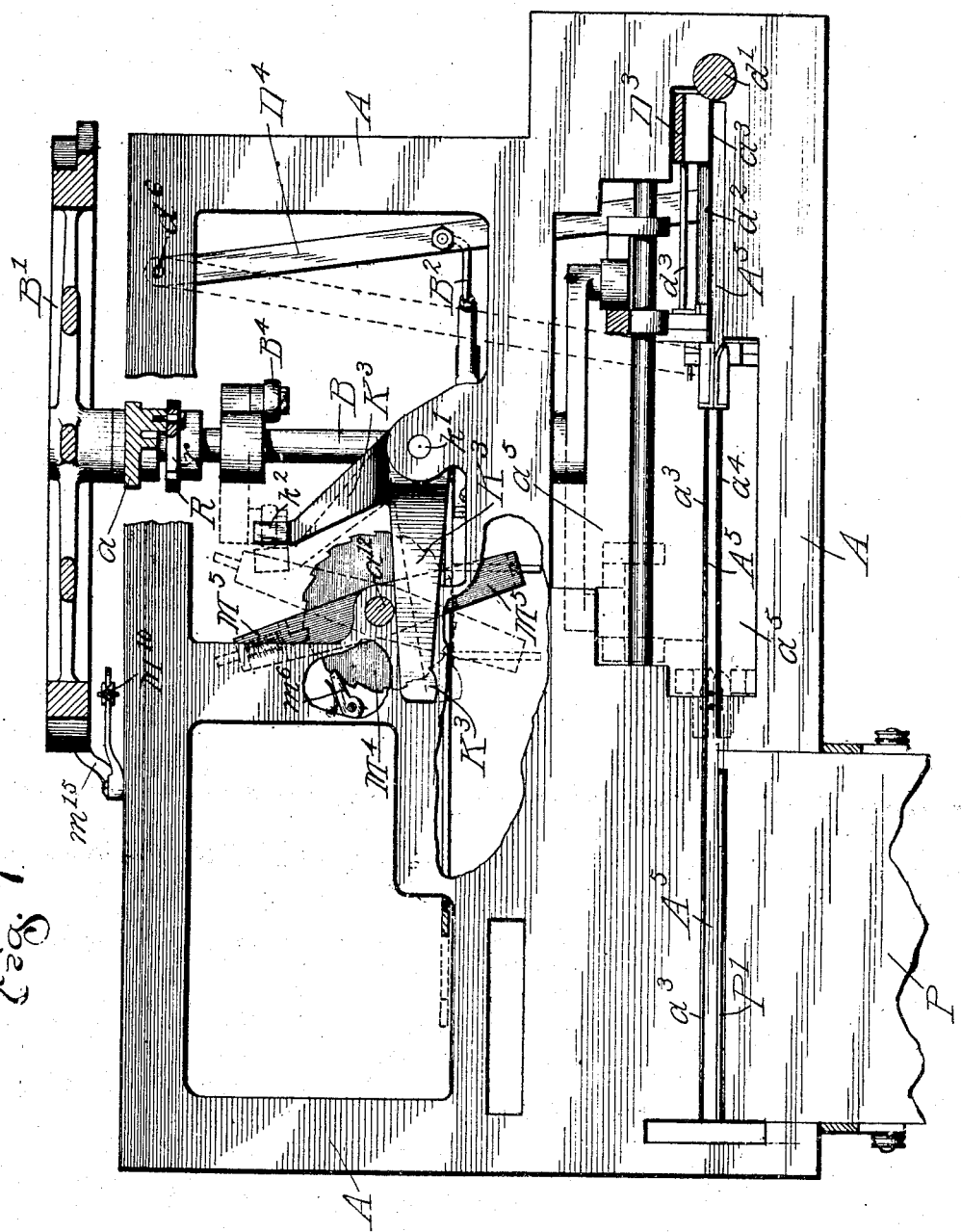

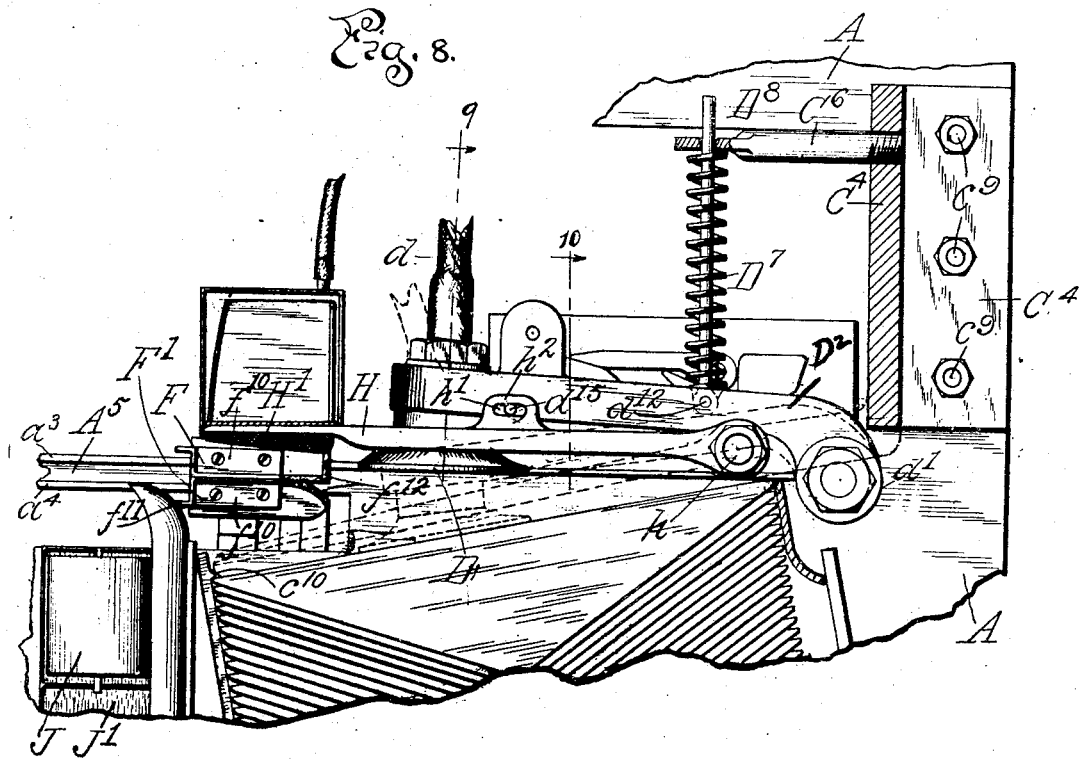
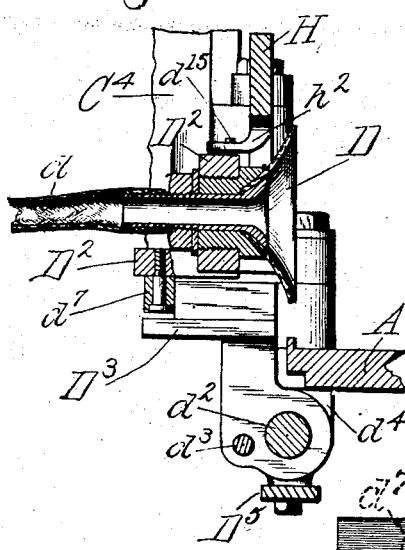
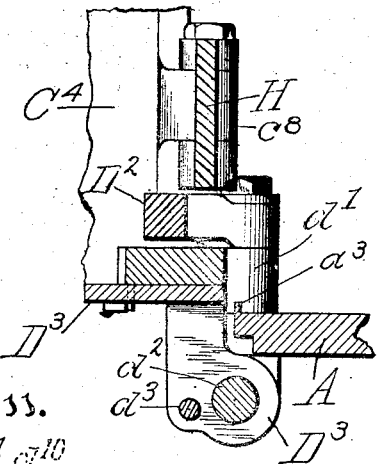
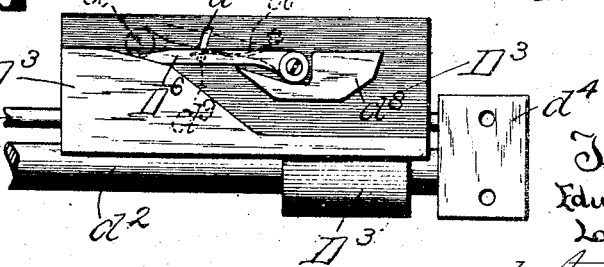

No. 884,337. PATENTED APR. 14, 1908.
E. C. MORRIS & L. J. HALL.
MACHINE FOR STAMPING AND SEALING MAIL MATTER.
APPLICATION FILED SEPT. 19, 1898. RENEWED JAN. 16, 1903.
11 SHEETS—SHEET 9.
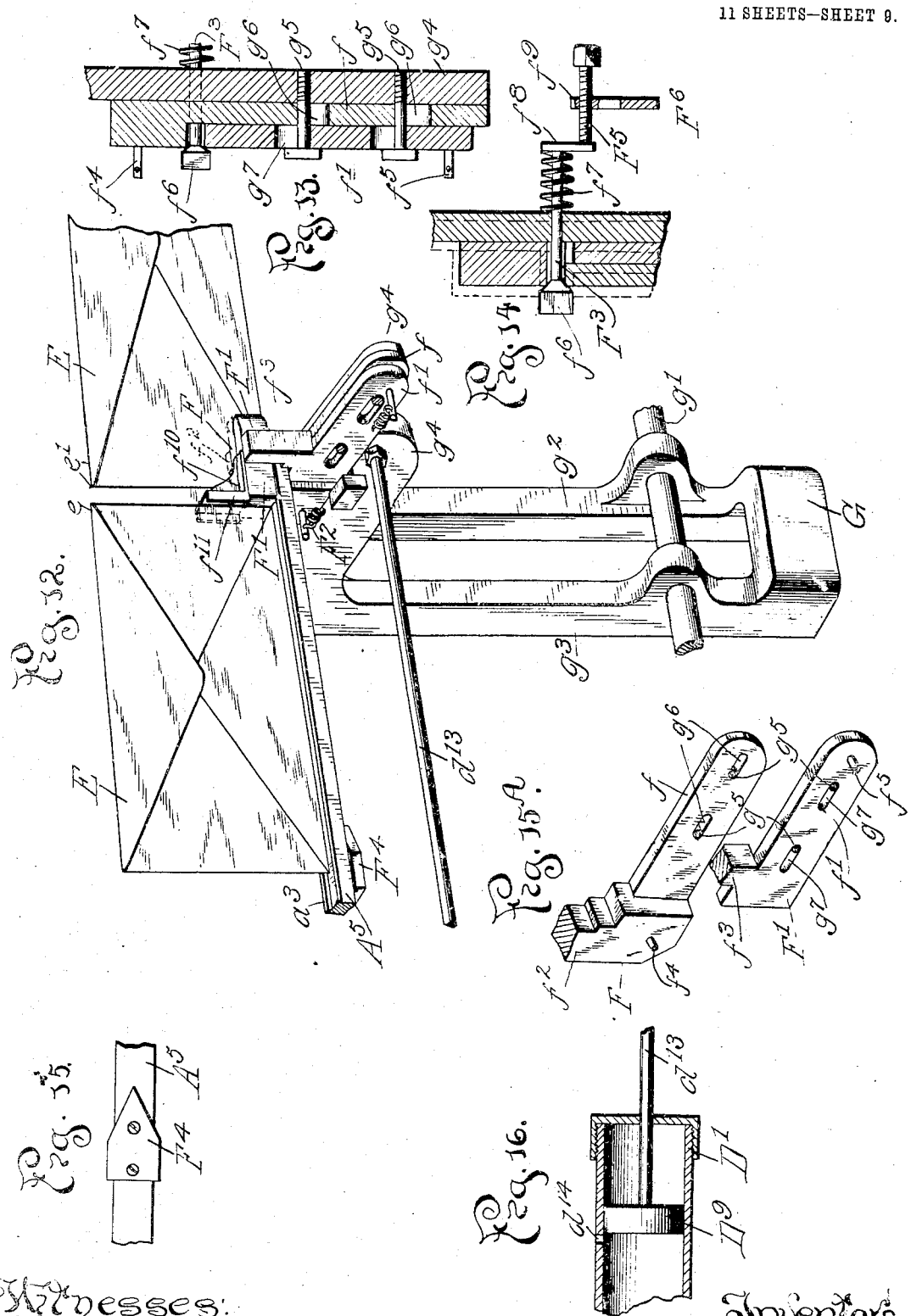

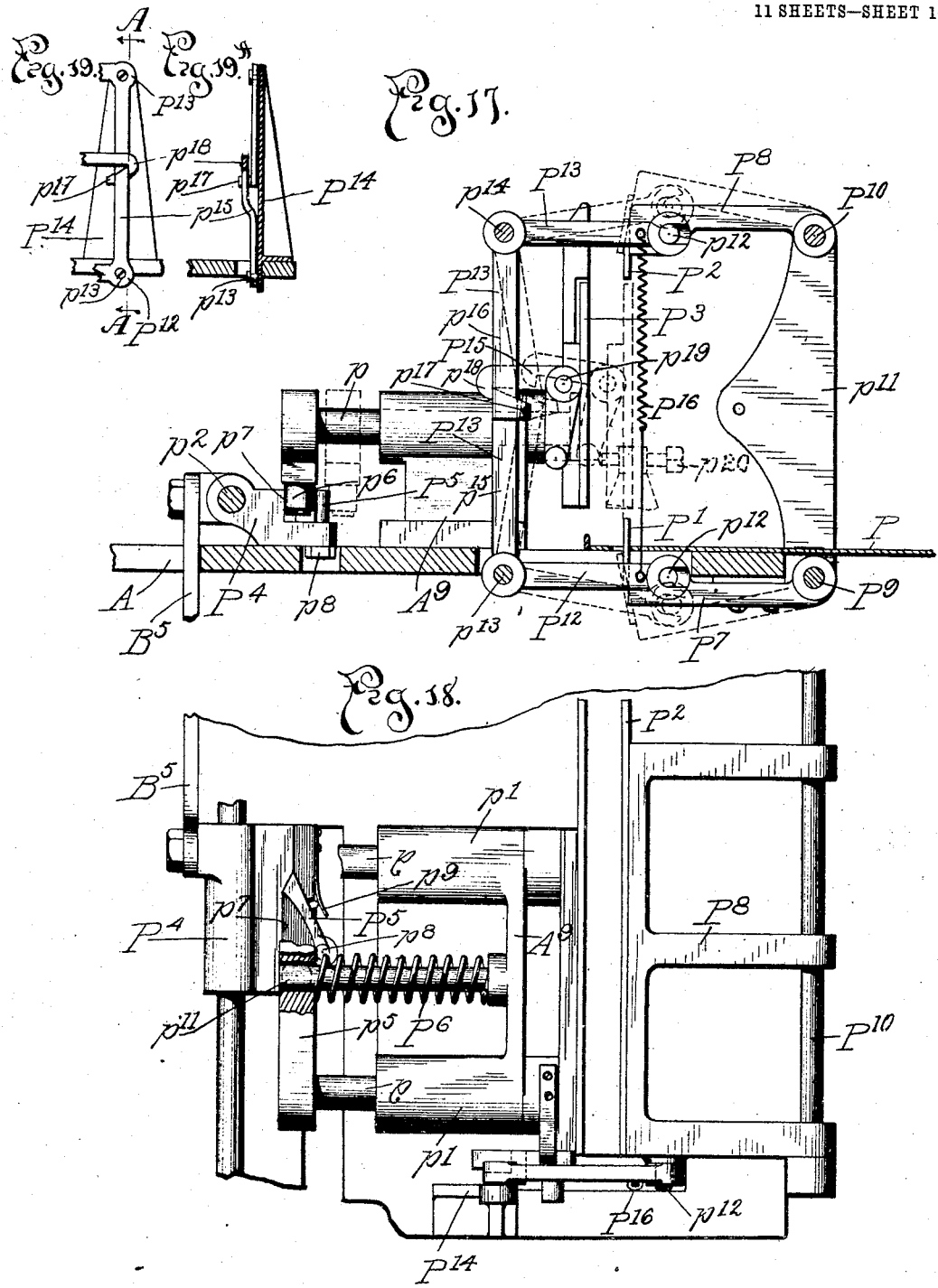

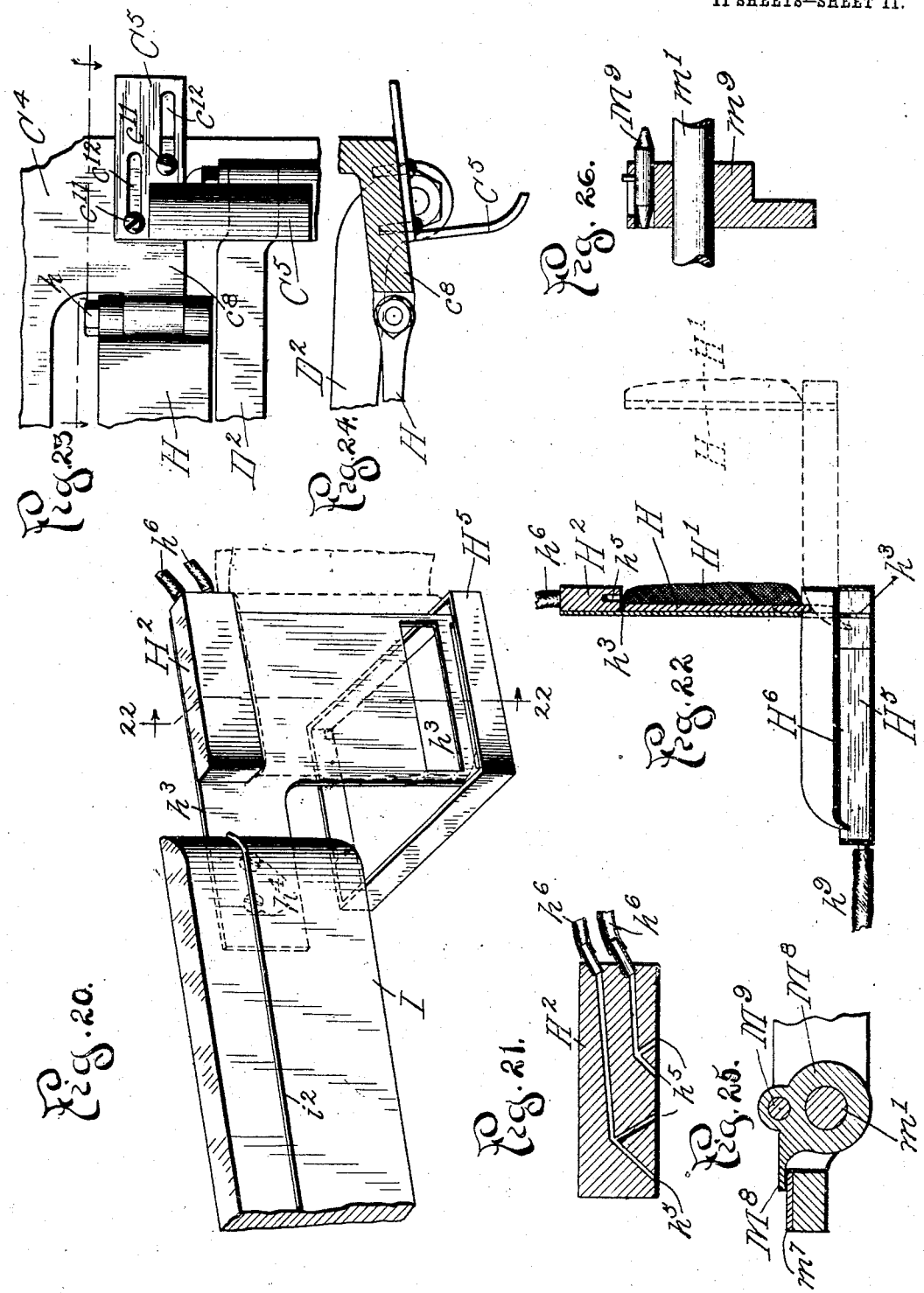

UNITED STATES PATENT OFFICE.

EDWARD C. MORRIS AND LOUIS J. HALL, OF CHICAGO, ILLINOIS; SAID HALL ASSIGNOR TO SAID MORRIS.

MACHINE FOR STAMPING AND SEALING MAIL-MATTER.

No. 884,837.     Specification of Letters Patent.     Patented April 14, 1908.

Application filed September 19, 1898, Serial No. 691,321. Renewed January 16, 1903. Serial No. 139,353.

*To all whom it may concern:*

Be it known that we, EDWARD C. MORRIS and LOUIS J. HALL, of Chicago, in the county of Cook and State of Illinois, have invented certain new and useful Improvements in Machines for Stamping and Sealing Mail-Matter, of which the following is a specification.

This invention relates to improvements in machines for stamping and sealing mail matter and for other similar purposes, and is a further development of the invention set forth in our previous application numbered 653,832, filed October 2, 1897.

The invention consists in the matters hereinafter set forth and particularly pointed out in the appended claims, and will be fully understood from the following detailed description when read in connection with the accompanying drawings, in which,—

Figure 1 is a top plan view of a machine embodying our improvements in one form, the table of the stamp carriage being removed to better show the parts beneath it. Fig. 2 is a front elevation of the machine, with the envelop supply magazine removed. Fig. 3 is a side elevation of the machine. Fig. 4 is a rear elevation thereof. Fig. 5 is a side elevation opposite to that shown in Fig. 3. Fig. 6 is a sectional side elevation looking in the same direction as Fig. 5, but taken on line 6—6 of Fig. 1. Fig. 7 is a plan view partly in section of the base plate of the main frame and the parts beneath it, the upper works of the machine being omitted. Fig. 8 is an enlarged sectional detail of the vacuum separator and of the devices for moistening the faces and flaps of the envelops. Fig. 9 is a sectional detail taken on line 9 of Fig. 8. Fig. 10 is a similar view taken on line 10 of Fig. 8. Fig. 11 is a top plan detail of the reciprocating cam plate which gives motion to the vacuum separator. Fig. 12 is a perspective detail of the carrier plate and jaws for transferring the envelops from the magazine to the stacker. Fig. 13 is a detail section taken on line 13 of Fig. 6. Fig. 14 is a sectional detail of the tripping mechanism for releasing the carrier jaws to permit them to clamp the envelops, the section being taken on line 14 of Fig. 6. Fig. 15 is a bottom plan detail of the wedge for spreading the carrier jaws at the end of their operative movement. Fig. 15ᴬ is a perspective detail of the two jaws of the carrier. Fig. 16 is a fragmentary sectional detail of the vacuum pump. Fig. 17 is a detail in side elevation, with parts in section, of the stacker. Fig. 18 is a top plan detail thereof. Fig. 19 is an inside elevation of the bell cranks of the stacker and their supporting bracket. Fig. 19ᴬ is a sectional elevation thereof on line A—A of Fig. 19. Fig. 20 is a perspective detail of the moistener for the faces of the envelops. Fig. 21 is a sectional detail of the perforated block through which water is supplied to the moistener. Fig. 22 is a sectional detail taken on line 22—22 of Fig. 20, assuming the moistener arm to be in its retracted position. Fig. 23 is a detail of the adjustable guide in the corner of the magazine. Fig. 24 is a sectional detail taken on line 24—24 of Fig. 23. Fig. 25 is a sectional detail of the position indicator for the carriage taken on line 25 of Fig. 1. Fig. 26 is a sectional detail of the direction indicator for the carriage taken on line 26 of Fig. 1.

In the operation of our improved machine it is contemplated that envelops to be sealed and stamped will be supplied in quantities to a magazine from which they will be delivered one by one to a carrier that will transfer them in succession past suitable moistening, sealing and stamp affixing devices, to a stacker from which they will be finally delivered in quantities, as supplied, but with flaps securely sealed and with postage stamps properly affixed to their faces. Accordingly, in addition to its main framework and driving mechanism, the machine may be said to comprise generally a receiving magazine provided with mechanism for separating the foremost envelop from the pack and presenting it to the carrier, a carrier mechanism for taking each envelop in turn from the magazine and transferring it past the stamp affixing mechanism to the stacker which also completes the sealing, a stamp affixing mechanism, including means for feeding a sheet of stamps to a plunger or equivalent device by which a single stamp is detached from the sheet and applied to each envelop as it is presented by the carrier, a stacker which bunches the sealed and stamped envelops, and devices arranged along the path of movement of the envelops for moistening their faces preparatory to receiving the stamps, and for moistening, and turning down the envelop flaps preparatory to their being sealed by the stacker. For the sake of clearness in the following detailed description theses several mechanisms, with the exception of the moistening devices, which are difficult to segregate from the adjacent mechanisms, will be taken up and disposed of in the indicated order as nearly as practicable.

The main frame of the machine comprises a base plate A, herein shown as substantially rectangular in shape, which is supported at its corners by suitable legs $A^1$ $A^2$ $A^3$ and $A^4$. A main driving shaft B journaled in bracket bearings $a$ and $a^1$ that depend from the under side of the base plate, extends horizontally from beneath the plate from front to rear and is provided at its rear end with a rigidly attached fly wheel $B^1$ having a crank handle $b$ by which the shaft may be rotated in one direction, its reverse rotation being prevented by a ratchet wheel R and pawl $r$. Suitable connections for rotating the shaft from a motor or from any available source of power may also conveniently be provided but are not illustrated herein. The driving shaft is operatively connected with the several mechanisms of the machine in a manner hereinafter fully described, and serves to actuate the same in proper relative order.

*Magazine.*—The magazine and attendant mechanism for separating the envelops may be described as follows: C designates a receiving table that projects forwardly, and with a slight angle laterally, from the right hand front corner of the base plate A, as shown in Figs. 1 and 8. The width of the table is made great enough to permit the longest envelop for which the machine is designed to extend transversely across it between the side walls $c$ and $c^1$, and it may be made of any desired length and capable of receiving a large number of envelops when the latter are set on edge in the manner illustrated. The envelops E are designed to be continually pressed forward on the table C by a suitable presser $C^1$, which in this instance consists of an angle plate having a vertical wall $c^2$ that engages the envelops and a horizontal base $c^3$ that rests and slides on the table C. This angle plate is maintained under a constant tendency to move inwardly by cords $C^2$ which are trained over pulleys $c^4$ and carry weights $C^3$ at their depending ends, said cords being made fast to brackets $c^5$ which project laterally from the end walls $c^6$ of the angle plate through slots $c^7$ in the side walls of the table (Figs. 1 and 3).

The path of movement of the envelops between the magazine and the stacker extends transversely across the machine from right to left and is indicated in the drawings by a channel or groove $A^5$ which is shown conspicuously in Fig. 7. The back side of this channel consists of a ledge $a^3$ which projects slightly above the surface of the base plate and is shown as extending continuously almost the entire length from right to left of the plate. The front side of the channel consists of a similar ledge $a^4$ parallel to the ledge $a^3$ but extending only from the inner side of the magazine to the inner side of the stacker, the ledge being cut away as shown in Fig. 7, this ledge being cut away or discontinued in front of the magazine and stacker to permit the envelops to be moved horizontally into and out of the channel or groove. The middle portion of this channel $A^5$ is herein shown as extending across or spanning the irregular opening or aperture $a^5$ in the base plate (as better shown in Fig. 7), and for convenience in manufacture this portion of the channel is made in this instance in a separate piece from the base plate, as indicated in section in Fig. 6, but it will be understood that this is an immaterial detail referred to only for the purpose of enabling the drawings to be clearly interpreted. The angular arrangement of the receiving table C is purposely designed to make the envelops E approach the channel or path $A^5$ with their outer ends foremost, as shown in Figs. 1 and 8 (the term foremost being here used with reference to the direction of motion of the package of envelops as they are fed along in the magazine).

The pressure of the presser $C^1$ forces the package forward until the outer end of the foremost envelop is stopped by the contact of its lower edge or corner with the rear ledge $a^3$ of said channel $A^5$ and by the contact of its upper corner with the face $c^8$ of a stop plate $C^4$ which is herein shown as fastened to the base by bolts $c^9$, said face of the plate being arranged at an angle corresponding with the angle of the approaching envelops and with its inner edge directly above the front face of the ledge $a^3$, as shown in Fig. 8. The inner end of the foremost envelop is simultaneously stopped by a narrow rib or ledge $c^{10}$ on the inner wall $c$ of the receiving table. This stop $c^{10}$ is just large enough to normally check the advance of the envelops at this end without preventing the end of the foremost envelop from being readily pulled past it by the separator, presently to be described, and which operates to swing the foremost envelop about its outer end as a pivotal point until it stands square with the machine and in line with its path of movement or channel $A^5$. In their advance along the receiving table the envelops in the magazine are guided at their inner ends by the inner wall $c$ of the receiving table, and at their outer ends by a guide plate $C^5$ which is herein shown as secured to the face $c^8$ of the stop plate $C^4$ by screws $c^{11}$ Fig. 23. Conveniently also and for the purpose of providing for envelops of different lengths this guide plate is made adjustable, in this instance by passing the fastening screws $c^{11}$ through slots $c^{12}$ of the plate. The guide plate is set at a distance from the inner wall $c$ of the receiving table just equal to the length of the envelops to be operated on, and its particular function is to keep the foremost envelops in close contact at their inner ends with said inner wall so that they will be properly engaged by the stop $c^{10}$ and so that the succeeding envelops will be held by this stop from being swung forward with the foremost envelop when the latter is caught by the separator. When the guide plate $C^4$ is made separate from the outer wall $c^1$ of the receiving table, as thus herein shown, said outer wall has no important function, and may conveniently be omitted to enable the envelops to be more easily introduced to the magazine.

The form of separator herein shown, and which is deemed to be practically the most advantageous for use in this connection, is a vacuum device consisting of a sucker disk D movably mounted to swing toward and from the package of envelops in the magazine and connected by a tube $d$ with any suitable vacuum pump or chamber $D^1$ herein shown as conveniently mounted at the front of the machine beneath a base plate and near the left side thereof, as better shown in Fig. 2. The sucker disk is in this instance shown as conveniently mounted at the free end of a swinging arm $D^2$ which is pivoted on a boss $d^1$ that rises from the base plate at a point just outside the guide plate $C^5$ and substantially in line with the channel $A^5$. This arm is given a to and fro motion with each revolution of the drive shaft B by means of a cam plate $D^3$ mounted on guide rods $d^2$ and $d^3$ that extend transversely beneath the base plate supported in depending brackets $d^4$ and $d^5$ thereof (Figs. 2, 7, and 11). Said cam plate is herein shown as reciprocated by a lever $D^4$ which is pivoted at $d^6$ beneath the rear edge of the base plate and has its free end connected with the cam plate by a link $D^5$. Said lever is connected between its ends with a pitman $B^2$ which is provided at its inner end with a circumferential strap $b^1$ that incloses an eccentric $b^2$ on the drive shaft B (Figs. 2, 3 and 6). The cam plate is cut away on its upper surface to afford a loop shaped path of movement for a depending pin $d^7$ on the sucker arm $D^2$, the center of said loop being left in the shape of an irregular block $d^8$, as shown in Fig. 11. At the left of this center block the path cut away on its front side extends inwardly and rearwardly at an angle and is closed by a latch $D^6$ pivoted in a convenient recess of said center block $d^8$ of the loop so that the rear face of said latch is substantially continuous with the rear face of said center block.

A spring $d^{10}$ is applied to the latch to normally maintain it closed, said spring being herein shown as conveniently located on the under side of the cam plate and as acting on a pin $d^9$ which projects downwardly from the latch through a slot $d^{11}$ in the plate. The sucker arm is constantly pressed forward by a spring $D^7$ mounted on a guide rod $D^8$ which is pivoted at $d^{12}$ to the sucker arm and which extends at its opposite end through a guide aperture in the end of a guide pin $C^6$ that projects from the plate $C^4$ (see Fig. 8). As the cam plate moves from right to left the pin $d^7$ slides along the back side of the latch and center block and prevents the sucker arm from moving forward under the pressure of the spring $D^7$, but as the right end of the center block passes beyond the pin said spring operates to throw the sucker arm forward and press the sucker against the foremost envelop in the magazine. The sucker itself is desirably made of flaring bell shape (Fig. 8), and is composed of rubber or other elastic and yielding material so that it will readily conform to and fit closely against the surface of the envelop even though the latter is made somewhat irregular by the matter inclosed within the envelop, and the suction of the vacuum causes it to adhere with sufficient tenacity to draw the envelop along with it when the sucker arm is swung back. This occurs in the movement of the cam plate from left to right as the pin $d^7$ is forced through the inwardly and rearwardly inclined path at the left end of the center block $d^8$, the latch $D^6$ springing shut behind the pin after being forced open by the latter near the extremity of the movement, so that as the cam plate starts again to move from right to left the pin must pass again along its back side and repeat the cycle.

The face of the sucker when in its rearmost position occupies substantially the same vertical plane as the forward edge of the ledge $a^3$ which marks the rear side of the transverse path of movement $A^5$ of the envelop, and the envelop (Fig. 8) is consequently swung around by the action of the sucker until it stands directly in said path of movement and is in position to be seized by the jaws F $F^1$ of the carrier mechanism presently to be described. As soon as the envelop has reached this position the vacuum is broken by any suitable means and the envelop released from the sucker which then remains idle until this envelop is removed by the carrier jaws, after which it is immediately again swung forward to engage the succeeding envelop. As the foremost envelop is thus carried forward by the vacuum separator the succeeding envelops will be pushed forward slightly by the presser $C^{11}$ but will be prevented from following the first envelop by the projecting rib $c^{10}$ on the inner side wall $c$ of the receiving table until it in turn is engaged and drawn forward by the vacuum separator in the next succeeding movement of the latter. The vacuum pump $D^1$ is herein shown as comprising simply a cylinder having a piston $D^9$, the piston rod $d^{13}$ of which is secured to a reciprocating carrier plate G upon which the jaws F F¹ are mounted (Fig. 2). The pump is without valves and its only port, except the connection at the left end of the cylinder for the suction pipe $d$, is an aperture $d^{14}$ near the right hand end of the cylinder which is uncovered by the piston to break the vacuum at the end of its suction movement and at the instant at which the envelop is seized by the jaws. Fig. 8 shows the positions of the parts just after the vacuum has been broken and the envelop seized by the jaws as above stated.

The moistening of the face of each envelop preparatory to receiving the stamp is designed in this improvement to be accomplished before the envelop is separated from the pack, and the devices provided for the purpose are in this instance arranged for operation in connection with the vacuum separator as follows: H designates a swinging arm pivoted at $h$ to the front of the stop plate C⁴ adjacent to but inside of the pivotal point of the sucker arm D² (Fig. 8). Said arm H extends inwardly beyond the sucker and is provided on its face at its extremity with a moistening pad H¹ of any suitable or desired material. The moistener arm is furthermore located just above the sucker arm and is cut away or shaped to avoid interference with the sucker, as shown in Fig. 2, but the two arms are connected to move simultaneously by a pin $d^{15}$ which projects upwardly from the sucker arm through an aperture $h^1$ in a rearwardly projecting flange $h^2$ of the arm H. By reason of this connection the moistener arm is swung forward by the sucker arm and again retracted with each movement of the latter, and the pad H¹ is consequently brought into contact with the face of the envelop simultaneously with the engagement of the sucker therewith. Owing, however, to the relative arrangement of the pivotal points of the two arms and to their relative lengths and the nature of the connection between them, the moistening pad, which is normally arranged to stand slightly back of the path A⁵ of the envelops, will be moved through a somewhat greater distance and at a correspondingly higher rate of speed than the sucker both in its forward and return movement, and after moistening the face of the envelop at the moment of the engagement of the sucker therewith will immediately be retracted from the envelop as the latter is swung around by the sucker and will stand clear of it when it reaches said path of movement A⁵. In this manner all danger that the moistener may interfere with the action of the vacuum separator is obviated, and the immediate retraction of the moistener from the envelop tends to prevent an excess of moisture from trickling down the face of the envelop below the spot which is intentionally wetted. Desirably, and as herein shown, this spot will be at the upper right hand corner of the face of the envelop so that the stamps when applied will occupy this customary position. Water is shown as supplied to the pad H¹ from a perforated block H² which is supported in a stationary position just above the rearmost position of the pad by being secured to the upper front face of a thin plate $h^3$ that is rigidly secured to the back of a guide plate I by screws $h^4$ or otherwise (see Figs. 20 and 22). This guide plate extends transversely of the machine immediately above and at the back side of the path or channel A⁵ and is hereinafter more particularly described in connection with the stamp affixing mechanism. Water channels or perforations $h^5$ (Fig. 21) are formed in the block H² and connected by tubes $h^6$ with a supply funnel H³ herein shown as mounted on the inner upper end of the stop plate C⁴. Water may be dropped into this funnel from any suitable source of supply, in this instance afforded by a tank H⁴ also mounted on the plate C⁴ and having a cock $h^7$ arranged to discharge into said funnel. To carry off the excess of water thus applied the plate $f^3$ which supports the perforated block H² also carries at its lower end below the moistener pad H¹ a drip basin H⁵ arranged to catch any water which may run down the plate $h^3$ or drip from the pad when in its rearmost position, as shown in full lines in Fig. 22. As a further improvement, and for the purpose of catching any water which may drip from the pad when swung forward away from the plate $h^3$ a rearwardly projecting trough H⁶ is fastened to the moistener arm just below the pad and projects rearwardly through an aperture $h^8$ in said plate $h^3$, its length being made somewhat greater than the throw of the moistener arm so that even in the foremost position of the latter this trough will extend back over the basin H⁵ in position to discharge into the latter. The water which collects in said basin H⁵ is carried off through a tube $h^9$ to any suitable point of discharge.

*Carrier mechanism.*—The transfer of the envelop from the magazine along the path A⁵ past the stamp affixing mechanism to the stacker is accomplished by two successive actuating movements of the reciprocating jaws F F¹. In the first of these movements the envelop is seized between the jaws by its lower left hand corner (looking from the front of the machine), carried to the stamp affixing mechanism, and then released while the jaws return for the succeeding envelop. In the second movement the jaws, then closed upon and advancing with said succeeding envelop, engage the right hand end of the first envelop and push it along past the stamp affixing mechanism to the stacker. The mechanism which accomplishes this action may be described as follows: G designates a carrier plate mounted to reciprocate on transverse horizontal guide rods $g$ and $g^1$ that are supported beneath the base plate in depending brackets $a^6$ and $a^7$ thereof. These brackets and guide rods are well shown in Fig. 2, except that the right hand end of the upper guide rod $g$ is concealed in this view by the guide rod $d^2$ of the cam plate $D^3$ which stands in front of it and which, being herein shown as of the same diameter and as at exactly the same distance below the base plate, appears practically coincident with it in this view. Said carrier plate is formed with two vertical guide bars $g^2$ and $g^3$ (Fig. 12) which embrace between them the crank pin $b^3$ of a crank $B^3$ carried on the front end of the main drive shaft B (Fig. 2) so that as said shaft is rotated the carrier plate is reciprocated to and fro on its guide rods $g g^1$ once with each revolution. Near the upper end of the left hand vertical guide bar $g^3$ the carrier plate is provided with a bracket arm $g^4$ which extends forwardly just beneath the channel bar $A^5$, and the jaws F $F^1$ are movably mounted on this bracket arm by means of bolts $g^5$ which project through horizontal slots $g^6$ and $g^7$, respectively, (Fig. 15$^a$) in the bases $f$ and $f^1$ of said jaws, the jaws themselves being supported above the channel $A^5$ by means of vertical arms $f^2$ and $f^3$ which project upwardly from the bases $f f^1$ on opposite sides of said channel.

The jaws tend at all times to shut together by reason of a spring $F^2$ (Fig. 6) which is connected at its opposite ends to projecting pins $f^4$ and $f^5$ on their bases $f f^1$, but can be held separated by latching bolt $F^3$ which is arranged to reciprocate transversely through the arm $g^4$ of the carrier plate just beneath the bases of the jaws, and is provided with a head $f^6$ adapted to enter between the abutting shoulders ($f^{13}$ and $f^{14}$) of said bases. (Figs. 13 and 14). A spring $f^7$ provided on this latching bolt between the arm $g^4$ and an enlargement or toe $f^8$ on the right hand extremity of the bolt tends to normally force its head $f^6$ between the bases $f f^1$, but the shape of the parts is such that if said bolt is once shifted to withdraw its head $f^6$ from between said bases $f f^1$ of the jaws and permit the latter to close it will remain thus shifted and the jaws will remain closed until they are forcibly separated to permit the head of the bolt to again spring in between their bases. The separation of the jaws in this manner is accomplished near the left hand end of the movement of the carrier plate by a wedge $F^4$ (Figs. 12 and 15) that in this instance is secured to the under side of the channel bar $A^5$, the point of the wedge being directed to the right so that it will enter between the abutting edges of the bases $f f^1$ of the jaws above the latching bolt $F^3$ and force them apart far enough to permit the head of the bolt to enter between them. On the other hand, the shifting of the latching bolt to permit the jaws to close is accomplished at the extreme right hand end of the movement of the carrier plate by a stop $F^5$ which in this instance takes the form of an adjustable screw mounted in the rearwardly projecting end $f^9$ of a stationary bracket $F^6$ which depends from the base plate of the machine, as shown in Figs. 2 and 14. In the latter figure the full lines show the positions of the jaws after the bolt has been pressed back by the stop $F^5$ to permit them to close, while the dotted lines indicate the open position of the jaws just previous and before the carrier quite reaches the tripping point.

The open jaws approach the magazine just as the foremost envelop is swung into line with the channel $A^5$ so that the left end of the envelop enters between them. The jaws are then tripped by the contact of the stop $F^5$ with the end of the latching bolt $F^3$ and instantly close upon the envelop under the tension of the spring $F^2$. This tripping of the jaws occurs simultaneously with the breaking of the vacuum and consequent releasing of the envelop by the sucker, and the envelop is thus left free to be carried forward with the jaws along the channel $A^5$ with the left hand stroke of the carrier plate immediately following. As the latter approaches the left end of its movement the jaws are opened by the wedge $F^4$ and the envelop is released and remains stationary while the jaws return for the succeeding envelop, the position of the first envelop at this time being substantially as illustrated in Fig. 12, in which it is shown as having been moved through a distance slightly greater than its length so that its right hand margin $e$ stands in a position a short distance to the left of the left hand margin $e^1$ of the succeeding envelop; or, in other words, a short distance to the left of the position occupied by its own left hand margin before it was moved by the jaws. The latter now close upon the succeeding envelop and behind the preceding envelop, and in the next left hand stroke of the carrier move both envelops forward through a distance nearly equal to the stroke of the carrier or until the jaws are again separated by the wedge. To insure a sufficient engagement of the jaws with the rear margin of the preceding envelop, said jaws are herein shown as provided with a pair of outwardly projecting sheet metal clips $f^{10}$, the outer margins $f^{11}$ of which may conveniently be bent forward to loosely inclose the envelop laterally. The faces of the jaws are furthermore desirably lined with rubber or other suitable substance as shown at $f^{12}$ in Fig. 8. The right hand end of the front jaw is also shown as beveled or pointed so that in case the envelops should stick together sufficiently to cause the vacuum separator to draw more than one envelop forward this jaw would tend to penetrate between and separate them. The shaping of the jaw in this manner tends also to prevent the envelop from being crumpled up by the jaw in case it should not have been carried forward far enough by the separator to properly enter between the jaws without striking them.

In the approved construction shown the flaps of the envelops are moistened by a suitable device located immediately to the left of the magazine and in front of the channel $A^5$, and consisting in this instance of a moistening roller J which is mounted to rotate freely within a small water tank or pan $J^1$ that rests upon a standard $J^2$ which rises from the base plate A. The top of the roller is arranged substantially on a level with the upper edges of the envelops in the magazine, and said envelops are purposely arranged with their flaps extending backwards in a substantially horizontal position at right angles to their body portion and overlapping each other, as shown in Figs. 1 and 8. The forward movement by which the foremost envelop is separated from the pack is not great enough to disengage its flap from the other envelops, and as this envelop is carried along by the jaws its flap will consequently be carried along also in a horizontal position so that its gummed under edge will be drawn across the moistening roller J. An upwardly and inwardly projecting guard $j$ is furthermore provided at the right of the roller to direct the flap properly across the top of the latter (see Figs. 1 and 2). After being thus moistened the flap is turned down against the back of the envelop in the continued movement of the carrier, and by means of a deflecting plate $J^3$, which is herein shown as secured by screws $j^1$ to the front face of the guide plate I above the path of the envelop. The right end of said deflecting plate extends in a tapering tongue $j^2$ to a point nearly half way across the magazine, as shown in Fig. 2. At its left end the deflecting plate is provided with a depending flange $j^3$ which extends rearwardly and inwardly on an angle and at the same time gradually increasing in depth until at a point $j^4$ in the vicinity of the stamp affixing mechanism it forms a vertically depending guide located so close to the guide plate I that in passing between them the envelop will have its flap folded down close against its back ready to adhere thereto by reason of the already moistened gum surface.

*Stamp affixing mechanism.*—The stamp affixing mechanism, as hereinafter described, includes a plunger or clamp device for separating the individual stamps from the sheet and applying them in turn to the moistened faces of the envelops, and a device for feeding a sheet of stamps to the plunger as required. Referring first to the plunger mechanism, $A^6$ designates a standard (Figs. 1 and 6) rigidly secured to the base plate about midway of the length thereof and behind the path of movement $A^5$ of the envelops, the upper part of said standard being cut out to form guides within which a plunger K is mounted to reciprocate from front to rear or transversely to the path of envelop movement. A head or die $K^1$ (Fig. 6) made of the exact size and shape of the stamp to be detached is secured to the forward end of the plunger and when the plunger is retracted stands with its front face a short distance behind the back of the guide plate I heretofore referred to. Mounted in said guide plate directly opposite the die is a die plate $K^2$ having an aperture just large enough to exactly fit the plunger, and which registers with a corresponding aperture $k$ in the guide plate, so that when the plunger is projected the die will be forced through the die and guide plates and project into the path of movement of the envelop. $A^7$ designates a standard (Figs. 2 and 6) that is rigidly secured to the base plate in front of the standard $A^6$ and on the opposite side of the path of movement of the envelops, and that is recessed in its upper portion to support a platen L arranged directly opposite the plunger K and against which the head or die of the plunger is designed to abut, said platen being desirably and herein shown as cushioned so as to afford a yielding resistance to the plunger by means of a spring $l$ inserted within the platen and herein shown as surrounding the sliding bolt $l^1$ which retains the platen movably within its socket in the standard $A^7$. Suitable means are provided for reciprocating the plunger once with each revolution of the drive shaft, consisting in this instance of a projecting lever $K^3$ and a retracting spring $K^4$. The former is made in the form of a bell crank pivoted at $k^1$ to the base plate, as better shown in Fig. 7, and having a downwardly projecting rear end $k^2$ adapted to be struck and oscillated by an arm $B^4$ on the drive shaft. The retracting spring $K^4$ for the plunger is herein shown as applied beneath the latter and within its supporting standard $A^6$, said spring being herein shown as placed loosely upon a guide bolt $k^3$ which projects freely through an aperture in the depending rear end $k^4$ of the plunger and the head of which abuts on the inner face of the overhanging front end $a^8$ of said standard $A^6$. An upwardly projecting bracket $A^8$ located immediately behind the plunger engaging end of the lever $K^3$ serves to limit the rearward movement of the lever and prevents the spring from forcing the plunger back too far.

The guide plate I is supported in position by both the standards $A^6$ and $A^7$, it being fastened at its lower edge by screws $i$ to the overhanging front end of the former, as shown in Fig. 6, and at its upper edge by screws $i^1$ to the rearwardly projecting top $a^9$ of the latter, as shown in Figs. 1 and 6. Fig. 6 also shows in section a small horizontal rib $i^2$ which projects from the face of the guide plate I just above the plunger aperture $k$, and which may conveniently consist of a wire soldered to the face of the guide plate, its object being merely to keep the face of the envelop from rubbing against the guide plate so as to spread and dissipate the moisture applied by the pad $H^1$. Immediately above this rib and forming in effect a continuation of the top of the flap deflecting plate J there is also shown a horizontal guide ledge $i^3$ projecting from the face of the guide plate I and serving to keep the envelops from being raised or forced up above their normal path of movement.

In the operation of the machine the stamps will be fed downwardly to the plunger between the guide plate I and a stripper plate $K^5$ which is fastened by screws $k^5$ to the overhanging front portion $a^8$ of the standard $A^6$, as better shown in Figs. 1 and 6. The body portion of this plate is arranged parallel to and immediately behind the guide plate I and is provided with an aperture just fitting the plunger die and through which the latter reciprocates. The forward movement or projecting of the plunger is timed to occur just after the envelop is released from the jaws at the left end of their movement, and the plunger and die are located directly opposite to the wetted spot at the upper right hand corner of the face of the envelop in the position occupied by the latter when thus released. In its forward movement the plunger die cuts a stamp from the sheet fed to it against the edges of the die plate and carries the stamp forward against the wetted corner of the envelop to which it at once adheres under the pressure of the die as opposed by the spring platen L which supports the back of the envelop against the impact of the die.

The devices herein shown for feeding stamps to the plunger comprise a stamp carriage M mounted to reciprocate transversely of the machine upon guide rods $m$ and $m^1$ that are supported at their ends in the upwardly projecting brackets $a^{10}$ $a^{10}$ and $a^{11}$ $a^{11}$, respectively, rising from the base plate A (Figs. 1 and 3). The movement of this carriage in each direction is designed to be accomplished in a succession of steps each equal in length to the width of a stamp, and the number of steps comprising the total effective movement of the carriage in each direction is normally one less than the number of stamps in each row of the sheet of stamps; i. e., where the ordinary U. S. Government sheets of one hundred stamps arranged in ten rows of ten stamps each are used the number of steps constituting the effective carriage movement in each direction will be nine. In the present improvements this step by step reciprocation of the carriage is accomplished by a gear segment $M^1$ which is arranged to rotate by intermitting movements between opposing parallel racks $M^2$ and $M^3$ on the carriage, the distance between the pitch line of the racks being exactly equal to the pitch diameter of the gear segment, so that in the revolution of the latter it will engage each of the racks in alternation. Said segment is herein shown as rigidly fastened to the upper end of a vertical shaft $m^2$ which is journaled at $a^{12}$ in the base plate and at $a^{13}$ in a rearwardly projecting lug of the plunger supporting standard $A^6$ (see Figs. 3, 6 and 7). To the lower end of this shaft is secured a ratchet wheel $M^4$ which is actuated intermittingly by an oscillating ratchet arm $M^5$ herein shown as mounted on the shaft just above the ratchet wheel and having at one end a spring pressed dog $m^3$ adapted to engage the teeth of the ratchet wheel. This ratchet arm is oscillated once in each revolution of the drive shaft by suitable connections therewith consisting in this instance of a pin $b^4$ which projects from the stacker operating pitman $B^5$ through a slot $m^4$ in the depending extremity $m^5$ of said ratchet arm $M^5$ (Figs. 2 and 5), said pitman $B^5$ being herein shown as pivotally secured at its inner end to the strap $b^1$ that incloses the eccentric $b^2$ heretofore described as operating the cam plate lever $D^4$ of the vacuum separator. The teeth of the ratchet wheel are herein shown as so shaped that said wheel, and consequently the gear segment, are moved in the same direction as the hands of a watch, looking at the parts from above, and a reverse rotation is prevented by a spring pressed stop pawl $m^6$ (Fig. 7). This direction of rotation of the gear segment is unimportant except as considered in connection with the location of two inwardly projecting abutments $M^6$ and $M^7$ that are rigidly fixed on the racks $M^2$ and $M^3$ at their opposite ends Fig. 1. These abutments are designed to secure the positive and exact engagement of the segment with the racks at the beginning of the carriage movement in each direction, and each is struck in turn by the forward end of the segment as the latter comes into mesh with that rack to which it is affixed. Thus when the direction of rotation of the segment is right handed in plan view, as stated, the abutment $M^6$ of the front rack $M^2$ is located at the left end of the latter, and the contact of the front end of the segment with this abutment will occur when the carriage is at the extreme right end of its movement, and will mark the beginning of its return movement to the left. The abutment $M^7$ of the rear rack, on the other hand, is located at the right end of the rack, and the contact of the front end of the segment with this abutment will occur when the carriage is at the extreme left end of its movement and will mark the beginning of the movement of the carriage to the right. In other words, each abutment acts in effect as an enlarged first tooth by which its rack is brought into correct mesh with the segment at exactly the right point in each revolution.

The pitch circumference of the segment is made equal in length to twice the length of the effective carriage movement plus twice the length of one step in such movement; i. e., is made in the present instance equal in length to twenty times the width of one stamp, while the length of the segment measured on its pitch circumference is theoretically made just equal to the effective carriage movement. The object of this proportioning is to provide for two idle steps in the rotation of the segment, one at each end of the throw of the carriage, during which the carriage will remain stationary after the segment has become disengaged from one rack and before it engages the other rack, this dwell of the carriage at each end of its throw being designed to permit the feeding down of a succeeding row of stamps to the plunger after the first row of stamps has been used up, and the detachment of the first stamp of the succeeding row by the next plunger movement before the carriage is again moved to bring the laterally succeeding stamp into position. Owing, however, to the impracticability of so forming the teeth of the racks and segment that they will move the carriage up to exactly the right point and then let go at exactly the right instant, and will correspondingly engage on the opposite side so as to start the carriage back at exactly the right instant; or, in other words, owing to the necessity of providing in practice for the bringing of the segment into and out of mesh with the racks before and after its effective actuating effort thereon, said segment is made slightly longer than the theoretically necessry length above stated by the addition of one or two extra teeth. These teeth still remain in mesh with the rack after the segment has commenced its theoretically idle impulse or step and before they become disengaged impart to the carriage a slight idle movement beyond the limits of its necessary movement, and to compensate for this the abutments $M^6$ and $M^7$ are so located that before the close of this theoretically idle impulse or step of the segment its front end is brought into contact with the adjacent abutment and moves the carriage back to the position which it occupied at the close of the preceding impulse of the segment. This slight idle movement to and fro of the carriage beyond its theoretical limit of movement takes place while the succeeding row of stamps is being fed to the plunger and between the strokes of the latter, so that so far as the action of the plunger on the stamps is concerned it may be utterly neglected, the effect being the same as though the carriage actually stayed at a standstill during the entire idle impulse of the segment.

As herein shown, an indicator $M^8$ secured to the rear guide rod $M^1$ serves to indicate the position of the carriage at the different stages of its movement upon a scale bar $m^7$ carried by the carriage. This scale bar is marked with lines $m^8$ corresponding to the points at which the carriage is held stationary while the stamp is detached by the plunger, said lines being numbered from 1 to 10, as shown in Fig. 1. The position of the carriage shown in this view is at the extreme left hand limit of its actual movement, and it will be noticed that the indicator $M^8$ points to a place on the bar $m^7$ slightly to the right of line 1. This distance between the point of the indicator and line 1 represents the idle movement of the carriage before referred to, and it will be understood that this movement occurs after the first dwell of the carriage at line 1 during which the last stamp of the row is affixed by the plunger, and that a reverse movement sufficient to bring line 1 back to the point of the indicator occurs before the next dwell of the carriage during which the first stamp of the succeeding row is detached by the plunger. To apprise the operator of the direction in which the carriage was moving prior to its being stopped at any time, another indicator $M^1$ (Figs. 1 and 4) is provided in the form of a sliding pin extending through an aperture in the right hand side bar $m^9$ of the carriage just above the rear guide bar $m^1$. Stationary stops $m^{10}$ and $m^{11}$ are arranged at the limits of the movement of this side bar and are adapted to strike the ends of the pin in turn so as to move it endwise in its aperture or socket and cause it to project in the opposite direction to the stop which it has thus last engaged. As herein shown, these stops are made in the form of adjustable screws mounted, respectively, in the indicator lug $M^8$ and in the corner standard $a^{11}$ at the right side of the machine. As the carriage approaches the limits of its movement to the left the left end of the pin $M^9$ strikes the screw $m^{10}$, causing its right end to project, as shown in Fig. 1, thus indicating that the direction of movement of the carriage during the next series of impulses will be to the right. When the carriage reaches the right hand end of its movement the pin will be shifted so that its left end will project and indicate that the following movement of the carriage will be to the left.

To prevent accidental displacement of the carriage at the limits of its movement and during the times in which the geared segment is passing from one rack to the other and is not in mesh with either, automatic locking devices are herein shown as provided, consisting in this instance of an upwardly spring pressed pin $M^{10}$ carried by an upwardly projecting bracket $m^{12}$ located at the rear of the base plate about midway between the ends thereof (see Fig. 4). The upper end of said pin impinges on the lower side of the scale bar $m^7$ of the carriage and is adapted to be forced upwardly by its spring $m^{13}$ through apertures $m^{14}$ located in the scale bar at points which are brought opposite the pin when the carriage reaches the limit of its movement in either direction. The pin remains in engagement with the holes only during the small interval elapsing between the disengaging of the last tooth of the segment from one rack and the contact of the front end of the segment with the abutment of the other rack, and is withdrawn in time to permit the starting back of the carriage by a cam $b^5$ on the periphery of the flywheel $B^1$ which engages at the proper moment the downwardly projecting end of a bell crank lever $m^{15}$, the other end of which is connected with the lower end of the pin. Normally the contact of the pin with the under side of the scale bar holds the pin depressed and maintains the lower end of the bell crank far enough from the periphery of the fly wheel to escape contact with the cam, but when at the limits of the carriage movement the pin is forced upwardly through one of the holes $m^{14}$ in said bar by the pressure of its spring $m^{13}$ the lower end of the bell crank is thereby swung in close to the fly wheel where it remains until struck by the advancing end of the cam in the next approach of the latter. The interval during which the carriage is locked will thus obviously be determined by the distance allowed between the advancing end of the cam and the lower end of the bell crank at the moment the pin springs into locking engagement with the carriage, which distance is herein shown as approximately one-eighth of the circumference of the fly wheel so that the length of said interval is in this instance approximately equal to a quarter revolution of the drive shaft. The length of the cam must be made great enough to maintain the pin retracted until the starting of the carriage again moves the adjacent aperture in the scale bar out of register with the pin, but is otherwise immaterial. The racks $M^2$ and $M^3$ of the carriage are herein shown as conveniently made adjustable therein, being secured in this instance by screws $m^{16}$ which pass through longitudinal slots $m^{17}$ in the racks, adjusting screws $m^{18}$ being furthermore herein shown as provided at the ends of the racks to facilitate their adjustment and provide positive abutments to resist the end thrust thereon.

In the present improvements the stamps are designed to be fed forward on the carriage by a feed mechanism constructed as follows: N designates a shaft mounted transversely of the carriage in bearings $n$ at its front end (Figs. 2–6). Secured on this shaft to rotate therewith are one or more serrated feed wheels $N^1$, the lower edges of which are arranged to barely clear the surface of a stamp table $N^2$ which is fastened to the top of the carriage, as shown in Fig. 6, this table being omitted from Fig. 1 to better show the carriage actuating mechanism. At its front edge this table terminates in a curved guide lip $n^1$ which extends downwardly to a point immediately above and in front of the stripper plate $K^5$, and an upper guide plate $n^2$ of generally similar curvature is fastened on the carriage just above this lip to form in connection therewith a guide opening or spout adapted to strip the sheet of stamps from the serrated feed wheels as it is fed forward thereby and direct them downwardly in front of the plunger. A suitable mechanism is provided to give the shaft N a rotary impulse at the opposite limits of the carriage movement, comprising, as herein shown, a ratchet wheel $N^3$ adapted for actuation by the ratchet pawl $n^3$ of an oscillating arm $n^4$ which is pivotally mounted on the shaft N adjacent to said ratchet wheel (Fig. 5). To oscillate this arm a lever $N^4$ is pivoted at $n^5$ to the frame of the carriage and provided at its forward end with a fork $n^6$ which embraces a wrist pin $n^7$ projecting from the oscillating arm. Its rear end is provided, in turn, with a wrist pin $n^8$ which is similarly embraced by the forked front end of a second lever $N^5$ that is pivoted to the carriage at $n^9$ directly back of the pivotal point $n^5$ of the front lever. The rear end of this second lever is engaged by a forwardly projecting radial arm $N^6$ of a rock shaft $N^7$ that is mounted transversely at the rear of the carriage in bearings $n^{10}$ (Fig. 1). Downwardly projecting pins $N^8$ are rigidly secured to this rock shaft near its ends and at a distance apart substantially equal to the effective carriage movement, said pins being herein shown as located at points substantially opposite to the abutments $M^6$ and $M^7$ of the carriage racks. These pins are struck in turn, as the carriage reaches the limits of its movement by the opposite ends of a double cam which is rigidly mounted on the shaft $m^2$ that carries the geared segment, and the rock shaft is thereby oscillated so as to throw its radial arm $N^6$ downward, this movement being transmitted through the levers $N^5$ and $N^4$ to the ratchet arm $n^4$ which is also oscillated downward and the pawl $n^3$ of which acts on the ratchet wheel $N^3$ to impart to the shaft N a rotary impulse sufficient to cause a peripheral movement of the serrated feed wheels equal in length to the length of one stamp and in a forward direction at their lower edges.

The idle return movement of the ratchet and its connected actuating lever is shown as accomplished by a spring $N^{10}$ which depends from the wrist pin $n^8$ to a pin $N^{10}$ on the carriage frame (see Fig. 5), as soon as the end of the cam arm passes the pin, and said arm is arranged in such position that it causes the feed wheel to advance as described immediately after that movement of the plunger which occurs on the arrival of the carriage at the limit of its effective travel and before the next movement of the plunger. If, therefore, a sheet of stamps is placed on the table $N^2$ with its forward end beneath the feed wheels $N^1$, it will be carried laterally with the carriage without any movement relatively thereto until the carriage reaches the end of its stroke, at which time the feed wheels will be actuated to advance the sheet by the length of one stamp, and if the sheet is so inserted that the lower corner stamp depends between the guide plates to a point opposite the plunger when the carriage is at the limit of its movement, each stamp of the lowermost row will be detached by the plunger, in turn, before the sheet is thus advanced. When the last stamp of the row has been detached the sheet will be fed forward during the dwell of the carriage at its limit of movement, and the first stamp of this new row will be detached by the succeeding plunger movement before the carriage starts back. The movement of the carriage will then begin and the operation will continue as before, the only limit being the length of the sheet of stamps provided. Successive sheets of stamps may also be handled continuously by connecting them together at their edges by adhesive strips, or by means of a suitable mechanism for feeding them forward in close succession so that the stamp will be presented to the action of the plunger without a break.

For the purpose of preventing the actuating impulse applied to the feed wheels from rotating further than the exact distance necessary to feed the sheet forward by just the length of one stamp, a stop pawl $N^{11}$ is pivoted to the carriage at a point $n^{12}$ between its ends and is provided with a slotted rear end fitting over a projecting pin $n^{13}$ on the lever $N^4$ (Fig. 5). The forward end of the pawl is turned up to form a hook $n^{14}$ that is adapted to engage the teeth of a second ratchet wheel $N^{12}$ which is provided on the shaft N and has teeth that are pointed in the opposite direction to the teeth of the actuating wheel $N^3$. The parts are so proportioned that this pawl is brought into engagement with the ratchet wheel $N^{12}$ just as the actuating pawl completes its actuating impulse on the ratchet wheel $N^3$, and the movement of the feed wheels is thus abruptly checked at exactly the right point instead of being continued somewhat by the inertia of the parts, as would otherwise tend to be the case. The bearings $n$ for the shaft N are conveniently herein shown as made vertically movable in slotted brackets $n^{15}$ of the carriage and are adjustably held therein by adjusting screws $n^{16}$ by means of which the feed wheels may be raised or lowered with relation to the stamp table $N^2$ to cause them to properly engage the sheet of stamps to feed it forward accurately and without cutting or perforating the paper undesirably.

*Stacker.*—As hereinbefore described, the application of the stamp to the envelop occurs after the first movement of the envelop from the magazine by the carrier jaws. The second movement of the envelop by these jaws carries it along the channel $A^5$ to a mechanism which bunches or stacks the envelops and at the same time applies the pressure which seals the already moistened and turned down flaps to the bodies of the envelops. The same pressure would also insure the adhesion of the stamps in case the action of the plunger was imperfect, but this plunger action is of such a positive nature that it is found in practice to almost invariably secure the perfect application of the stamps in the first instance. As herein shown, this stacker comprises a table P projecting forwardly from the channel $A^5$ at the end of the latter just to the left of the plunger (Fig. 1). The front ledge $a^4$ of the channel is cut away throughout the width of the table P and replaced by a vertically movable stop plate $p^1$ which projects upwardly through a slot in the table (Fig. 7) and a short distance above the surface of the same. A second movable stop plate $P^2$ is arranged vertically above the stop plate $P^1$ and at a point opposite the upper margins of the envelops as they stand on edge in the path $A^5$ (Figs. 17 and 18). Immediately below the guide plate I at the back of the path of movement of the envelop at the stacker a push plate $P^3$ is arranged to reciprocate forwardly and rearwardly between the stop plates $P^1$ and $P^2$, said push plate being herein shown as fixed to the front ends of a pair of parallel guide bars $p$ that are mounted to slide in the apertured upper portions $p^1$ of a standard $A^9$ that rises from the base plate at the rear of the table P.

The push plate is forced forward once in each revolution of the drive shaft by a cam plate $P^4$ that is mounted to reciprocate on a transversely extending guide bar $p^2$ carried by brackets $p^3$ on the base plate, the lower front edge of this cam plate being also herein shown as arranged to rest and slide on the base plate at $p^4$ (see Fig. 17), and the plate being further shown as pivotally connected to the end of the pitman $B^5$ which is secured at its other end to the strap of the eccentric $b^2$ on the drive shaft B so that the plate is moved back and forth as said drive shaft is rotated. The rear end of the guide bars $p$ are rigidly connected by a yoke $p^5$ from the lower side of which a pin $p^6$ depends into engagement with said cam plate. The latter is cut away at its front edge to provide a forwardly facing cam surface $p^7$ against which the free end of pivoted latching pawl $P^5$ is fitted, as shown in Fig. 18. This pawl is pivoted at $p^8$ to the cam plate far enough forward of the surface $p^7$ to permit the depending pin $p^6$ to pass between it and said surface and is normally held in a rearwardly inclined position by a spring $p^9$ which engages a depending pin or lug $p^{10}$ of the pawl. The guide bars $p$, and consequently the push plate $P^3$, are constantly pressed backward by a spring $P^6$ mounted on a guide pin $p^{11}$ that is fixed at its front end to the inner web of the standard $A^9$ while its rear end projects freely through an aperture in the yoke $p^5$. The pressure of this spring tends to normally maintain the pin $p^6$ pressed back against the cam surface $p^7$, but in the movement of the cam plate $P^4$ to the left the pin will be forced behind and past the pawl $P^5$ which will open to permit the pin to pass and then close in behind the pin so that in the return movement of the plate the pin will be forced to ride up the inclined front surface of the pawl and will thereby be forced forward so as to project the push plate between the stop plates $P^1$ and $P^2$, as shown in dotted lines in Fig. 17, but said push plate will remain thus projected only until the movement of the cam plate carries the pawl beyond the pin $p^6$ whereupon the latter will immediately snap back against the surface $p^7$ and the push plate will thereby be retracted.

At the moment of the projection of the push plate the movable stop plates are designed to be spread apart or respectively raised and lowered to permit the envelop which has just been advanced to the stacker by the carrier jaws to be moved forward by the push plate to a point in front of said stop plate, and to be closed in behind the envelop immediately thereafter so that when the push plate is retracted again the space between it and the stop plates will be again clear for the entrance of the succeeding envelop. To accomplish this movement of the stop plates $P^1$ and $P^2$ they are herein shown as secured to the rear ends of swinging frames $P^7$ and $P^8$, respectively (Fig. 17), that are pivoted at their front ends upon transverse pivot bars $P^9$ and $P^{10}$ carried in side plates $P^{11}$ which rise from the base plate on each side of the stacker table P. Projecting pins $p^{12}$ on the outer edges of these frames near their rear ends are engaged by the slotted front ends of bell crank levers $P^{12}$ and $P^{13}$, respectively, that are pivoted at $p^{13}$ and $p^{14}$ to the inner face of a rigid bracket $P^{14}$ which rises from the base plate at the extreme left hand edge of the latter and just behind the plane of the channel $A^5$. The other ends $p^{15}$ and $p^{16}$ of these bell cranks project, respectively, upwardly and downwardly toward each other and overlap at their extremities, the upper bell crank being provided at its lower extremity with a laterally projecting lug $p^{17}$ which projects in front of the overlapping upper end of the lower bell crank (Figs. 19 and 19A). Said upper end of the lower bell crank is arranged for engagement with the hooked rear end $p^{18}$ of a latching bell crank $p^{15}$ which is pivoted at $p^{19}$ to the frame of the push plate, so that immediately on the starting forward of the latter said lower bell crank will be oscillated to drop the lower stop plate $p^1$, and will simultaneously operate through the projecting lug $p^{17}$ of the upper bell crank to oscillate the latter to raise the upper stop plate $P^2$. Then after the envelop has been carried by the push plate to a point in front of said stop plates, the lower end of the latching bell crank $P^{15}$ strikes a stationary stop $p^{20}$ herein shown as made in the form of an adjusting screw inserted in a bracket $P^{20}$ on the base plate. This contact with the stop $p^{20}$ causes the latching lever to release the bell cranks $P^{12}$ and $P^{13}$ and permits the stop plates to be returned to their normal positions by a spring $P^{16}$ which is herein shown as applied to connect the forwardly projecting end of said bell cranks $P^{12}$ and $P^{13}$. A movable presser $P^{17}$ similar to the presser $C^1$ of the magazine is movably mounted on the stacker table and is pulled constantly inward toward the push plate by cords $P^{18}$ which are trained over pulleys $p^{21}$ and $p^{22}$ and carry weights $P^{19}$ at their lower ends. In the first operation of the machine and before any envelops have entered the stacker this presser will stand immediately in front of the stop plates and resting against the same. The first envelop carried forward by the push plate will, therefore, be compressed between the push plate and presser and its flap sealed by being pressed tightly against its back. Each succeeding envelop will be compressed in a similar manner between the push plate and the envelop preceding it and the effect will be in each case to render the sealing of the flap certain if the envelop has been properly gummed. The pressure thus applied to the envelop will moreover be continued as long as they remain in the stacker and will counteract all tendency of the flaps to spring open again after being sealed.

The operation of our improved machine as a whole will be fully understood from the description thus given of the operation of its several component mechanisms, and need not therefore be again rehearsed. It may be used without change to both stamp and seal envelops as described, or to stamp envelops or cards without sealing, or to seal envelops without stamping them. The same or substantially similar features of construction may also be employed in whole or in part in machines for affixing labels other than stamps, or in machines for affixing stamps or labels to articles or matter other than envelops or cards, and in case it is so desired the moistening devices may be supplied with mucilage instead of water and operated as gumming devices, or may be altered or replaced by more suitable devices for this purpose. The various mechanisms and features of improvement may also be found useful either separately or combined, in whole or in part, in stamp canceling machines or in other machines or connections widely different from those herein mentioned or suggested. While, therefore, for the sake of definiteness the language of the appended claims is couched in view of our design to provide primarily a machine for stamping and sealing envelops and the like, it will be understood that the terms used are intended to equally include the application of said mechanisms and features of improvement to the affixing of labels generally to all classes of articles to the handling of which they may be adapted, as well as their application in any other connection in which they may be found useful. It will also be understood that in each feature and mechanism a wide variety of changes and modifications may be made without departing from the spirit of the invention set forth.

We claim as our invention:—

1. A feed mechanism for envelops and the like comprising an envelop magazine, a presser for forcing the envelops forward in the magazine, and means for actuating the presser so as to automatically compensate for different thicknesses of envelops, a stop between which and the presser the envelops are positively compressed at one end, a device for temporarily checking the advance of the other end of the envelops, a separator for advancing this end of the foremost envelop separately past said checking device, and a carrier for pulling the advanced envelop from behind the stop and removing it from the magazine.

2. A feed mechanism for envelops and the like comprising an envelop magazine arranged transversely to a path of carrier movement, a presser for forcing the envelops in the magazine toward said path of movement, a stop approximately in line with said path of movement and between which and the presser the envelops are positively compressed at one end, a device back from said path of movement for temporarily checking the advance of the other end of the envelops, a separator for advancing this end of the foremost envelop separately past said checking device, and a carrier for pulling the advanced envelop from behind the stop and removing it from the magazine along said path of movement.

3. A feed mechanism for envelops and the like comprising an envelop magazine, a presser for forcing the envelops forward in the magazine, a stop between which and the presser the envelops are positively compressed at one end, a device for temporarily checking the advance of the other end of the envelops, a vibratory vacuum separator engaging the foremost envelop at this end to draw it separately past said checking means, and a carrier for pulling the advanced envelop from behind the positive stop and removing it from the magazine.

4. A feed mechanism for envelops and the like comprising an envelop magazine, a presser for forcing the envelops forward in the magazine, a stop between which and the presser the envelops are positively compressed at one end, a device for temporarily checking the advance of the envelops at the other end, a separator provided with a vacuum tip, means for positively pressing said tip against the exposed face of the foremost envelop, means for exhausting the air from the interior of the tip while in contact with the envelop, means for withdrawing the tip to swing the foremost envelop separately past said checking device and about the stop as an approximate axis, and a carrier for pulling the advanced envelop from behind said stop and removing it from the magazine.

5. In a machine of the class described, an envelop feed mechanism comprising a reciprocating carrier provided with envelop engaging jaws, a magazine extending transversely and at an angle to the path of movement of said carrier, a positive stop for the envelops located in line with said path of movement, a stop located on the opposite side of the magazine from the positive stop and at a distance from said path of movement for temporarily checking the advance of the envelops, and a separator mounted at the free end of the swinging arm pivoted in proximity to said positive stop and adapted to engage and swing each foremost envelop in turn about the positive stop as a center until in line with the carrier mechanism and in position to be engaged by the carrier jaws, substantially as described.

6. In an envelop stamping machine, comprising an envelop magazine, means for transferring the envelops in succession from said magazine to a stamp affixing mechanism, a reciprocatory stamp carrying mechanism for supplying stamps to said affixing mechanism, and a moistening device acting against the bunch of envelops in the magazine to moisten the surface of the foremost envelop, substantially as described.

7. An envelop stamping machine comprising an envelop magazine, means for pressing the bunch of envelops forward in the magazine against a stop therein, a moistening device acting against the bunch of envelops in the magazine to moisten the surface of the foremost envelop, means for separately advancing said foremost envelop, a stamp affixing mechanism, and a carrier for transferring the advanced envelop to the stamp affixing mechanism, substantially as described.

8. An envelop stamping machine, comprising an envelop magazine in which the envelops are arranged on edge, means for pressing the envelops forward in the magazine, means limiting the forward movement of the bunch of envelops, a separator for separately advancing the foremost envelop of the bunch, a moistening device operated by and with the separator to moisten the surface of said foremost envelop, a carrier for engaging and moving the advanced envelop, and a stamp affixing mechanism to which the advanced envelop is presented by the carrier.

9. An envelop stamping machine, comprising an envelop magazine arranged transversely to and at an angle with a path of envelop movement, means pressing the envelops in the magazine toward said path of movement, a vibratory separator adapted to engage and swing the foremost envelop into the path of envelop movement, a vibratory moistener acting to moisten the surface of said foremost envelop prior to its movement by the separator, a carrier arranged to engage the advanced envelop and transfer it along said path of movement, and a stamp affixing mechanism to which the advanced envelop is presented by the carrier.

10. An envelop stamping machine, comprising an envelop magazine arranged transversely to and at an angle with a path of envelop movement, means pressing the envelops in the magazine toward said path of movement, a pivoted vibratory separator adapted to engage and swing the foremost envelop into the path of envelop movement, a vibratory moistener pivoted at a point adjacent to the pivot of the separator and acting to moisten the surface of said foremost envelop, a carrier arranged to engage the advanced envelop and transfer it along said path of movement, and a stamp affixing mechanism to which the envelop is presented by the carrier.

11. An envelop stamping machine, comprising an envelop magazine, means pressing the envelops forward in the magazine, means limiting the forward movement of the bunch of envelops, a separator for advancing the foremost envelop of the bunch, a moistening device operated with the separator to moisten the surface of said foremost envelop, means for advancing and retracting the moistener more rapidly than the separator, a carrier for engaging and moving the advanced envelop, and a stamp affixing mechanism to which the envelop is presented by the carrier.

12. An envelop stamping machine, comprising an envelop magazine, means for pressing the envelops forward in the magazine, a pivoted separator for separately advancing the foremost envelop of the bunch, a moistening device pivoted at a point adjacent to and inside of the pivotal point of the separator, operative connections between the separator, and moistener whereby the moistener is advanced and retracted more rapidly than the separator, a carrier for engaging and moving the advanced envelop, and a stamp affixing mechanism to which the envelop is presented by the carrier.

13. In an envelop stamping machine, a horizontally movable moistener, means for projecting said moistener against the envelop, a drip device located above the retracted position of the moistener and adapted to keep the latter wetted, and a drip basin beneath said retracted position of the moistener, substantially as described.

14. In an envelop stamping machine, a moistening device arranged to be projected to moisten the surface of the envelop, means for supplying moisture to said moistening device, a drip basin located below and in proximity to the retracted position of the moistener, and a trough attached to the moistener and arranged to discharge into the drip basin in all positions of the moistener.

15. A feed mechanism for envelops and the like, comprising a magazine in which the envelops are arranged on edge, means limiting the forward movement of the bunch of envelops including a projecting stop at the side of the magazine adapted to engage the end of the foremost envelop, an adjustable guide plate at the opposite side of the magazine for directing the envelops into position to engage said stop, means for moving the foremost envelop separately past said stop, and a carrier arranged to engage and transfer the separated envelop.

16. A feed mechanism for envelops and the like, comprising an envelop magazine extending transversely and at an angle to a path of envelop movement, means pressing the bunch of envelops toward said path of movement, a stop plate in the line of said path of movement engaging the outer end of the foremost envelop, a stop projecting from the opposite side of the magazine at a point back from said path of movement for engaging the inner end of the envelop, an adjustable guide plate secured to said stop plate and serving to direct the envelops into position to engage said projecting stop, means for swinging the foremost envelop past said projecting stop into the path of envelop movement, and a carrier mechanism arranged to engage the separated envelop and transfer it along said path of movement.

17. A feed mechanism for envelops and the like, comprising an envelop magazine, means for pressing the bunch of envelops forward in the magazine against a stop therein, a pivoted separator adapted to engage and separately advance the foremost envelop past said stop, means for oscillating said pivoted separator comprising a reciprocating cam plate having a looped shaped path and a wrist pin on the separator engaging said path, and a carrier arranged to engage and transfer the advanced envelop, substantially as described.

18. The combination, with the main frame and drive shaft, of the magazine C provided with the presser $C^1$, stops limiting the forward movement of the bunch of envelops in the magazine, a pivoted separator adapted to engage and advance the foremost envelop, a carrier for transferring the separated envelop, and means for oscillating the separator comprising the cam plate $D^3$ reciprocated from the drive shaft and provided with a loop shaped path, a wrist pin $d^7$ projecting from the separator into said path, and a spring pressed latch $D^6$ pivoted to the cam plate and projecting across said path to determine the direction of the orbit of travel of said wrist pin, and a spring $D^7$ applied to normally maintain the separator projected except as it is forced back by said wrist pin.

19. The combination, with the main frame and drive shaft, of the magazine C provided with the presser $C^1$, stops limiting the forward movement of the bunch of envelops in the magazine, an oscillatory separator pivoted at $d^1$, connections with the drive shaft for oscillating said separator, an oscillatory moistener pivoted at $h^4$ adjacent to but within the pivotal point of the separator, a pin and slot forming an actuating connection between the separator and moistener, and a carrier for removing the separated and moistened envelop.

20. A feed mechanism for envelops and the like, comprising a reciprocating carrier provided with jaws, means for opening said jaws at one end of the carrier movement and means for closing the jaws at the other end of the carrier movement, said opening and closing means being so located relatively to the length of the envelops that the jaws engage the envelop at both ends in succession and forward it in two movements with an intermediate dwell.

21. A feed mechanism, comprising a reciprocating carrier provided with transversely movable jaws, a spring applied to normally close said jaws, a wedge at one end of the carrier movement operating to separate the jaws, a spring pressed latch bolt adapted to hold the jaws open when separated by the wedge, and a trip for the latch bolt at the other end of the carrier movement.

22. The combination, with a carrier mechanism for advancing an envelop or the like, of a stacker for bunching the envelops, comprising a reciprocatory push plate adapted to engage the advanced envelop, movable stop plates between which said push plate is adapted to be projected, and means for separating said stop plates and closing them behind the envelop when forwarded by the push plate.

23. The combination with a stamp affixing mechanism or the like, of a reciprocatory carriage for feeding stamps to said stamp affixing mechanism, inwardly facing racks on said carriage, a gear segment rotating intermittently between said racks and engaging the same in alternation, and means for giving the segment a rotary impulse with each operative movement of the plunger mechanism, substantially as described.

24. The combination, with a reciprocatory part provided with inwardly facing racks, of a gear segment rotating between the racks and engaging the same in alternation to reciprocate said part, abutments at opposite ends of the racks in position to engage the approaching end of the segment, and means for adjusting the racks, and means for adjusting the racks and abutments relatively to each other.

25. In a machine for affixing stamps or the like, the combination with mechanism for detaching the stamps from a sheet, of a reciprocatory stamp carriage provided with feed mechanism operating to move the sheet of stamps forward at each reversal of the carriage movement, inwardly facing racks on the carriage, a gear segment rotating intermittingly between said racks and engaging the same in alternation to reciprocate the carriage, and means for giving said segment a rotary impulse with each operative movement of the stamp detaching mechanism.

26. The combination with a plunger mechanism or the like, of a reciprocatory carriage having feed mechanism thereon, inwardly facing racks on the carriage, a gear segment rotating intermittingly between said racks and engaging the same in alternation, means for giving the segment a rotary impulse with each operative movement of the plunger mechanism, and means for actuating said feed mechanism during the passage of the segment from one rack to the other at each end of the carriage movement, substantially as described.

27. The combination with a plunger mechanism or the like, of a reciprocatory carriage having a sheet feeding mechanism thereon, inwardly facing racks on the carriage, a gear segment rotating between said racks and engaging the same in alternation, means for giving the segment a rotary impulse with each operative movement of the plunger mechanism, means for actuating the feed mechanism including movable parts mounted on the carriage at opposite ends of the racks, and a rotary part actuated with the gear segment and adapted to strike said movable part to actuate the feed mechanism at each end of the carriage movement, substantially as described.

28. The combination with a plunger mechanism or the like, of a reciprocatory carriage having a sheet feeding mechanism thereon, inwardly facing racks on the carriage, a gear segment rotating between said racks and engaging the same in alternation, means for giving the segment a rotary impulse with each operative movement of the plunger mechanism, means for actuating the feed mechanism including a rock shaft mounted on the carriage, radial arms projecting from said rock shaft, and a part rigidly connected with the gear segment to rotate therewith and adapted to strike and oscillate said radial arms in alternation at opposite ends of the carriage movement, substantially as described.

29. The combination with a plunger mechanism or the like, of a reciprocatory carriage having a sheet feeding mechanism thereon, inwardly facing racks on the carriage, a gear segment rotating between said racks and engaging the same in alternation, means for giving the segment a rotary impulse with each operative movement of the plunger mechanism, a ratchet mechanism for imparting a rotary impulse to the sheet feeding mechanism at each end of the carriage movement, and a stop pawl operatively connected with the ratchet mechanism for accurately limiting such rotary impulse, substantially as described.

30. The combination with a plunger mechanism or the like, of a reciprocatory carriage provided with a supporting table for sheet material, serrated feed wheels revolubly mounted in proximity to the table, inwardly facing racks on the carriage, a gear segment rotating between said racks and engaging the same in alternation, means for giving the segment a rotary impulse with each operative movement of the plunger mechanism, and means for imparting a rotary impulse to the feed wheels at each end of the carriage movement, substantially as described.

31. A combination with a plunger mechanism or the like, of a reciprocatory carriage provided with a supporting table for sheet material, serrated feed wheels revolubly mounted in proximity to the table, inwardly facing racks on the carriage, a gear segment rotating between said racks and engaging the same in alternation, a ratchet mechanism for imparting a rotary impulse to the feed wheels at each end of the carriage movement, and a stop pawl operatively connected with the ratchet mechanism to accurately limit such rotary impulse—substantially as described.

32. The combination with a stamp affixing mechanism or the like, of a reciprocatory carriage for feeding stamps to said stamp affixing mechanism, means for reciprocating said carriage in a step by step manner in both directions with a dwell at each end of the carriage movement, and means for locking the carriage stationary during the dwell at its limits of movement, substantially as described.

33. The combination with a main frame, of a reciprocatory part provided with inwardly facing racks, a gear segment rotating between said racks and engaging the same in alternation to reciprocate said part, locking devices applied between said part and main frame, and means for operating said locking devices at each end of the reciprocatory movement to hold said parts stationary during the passage of the segment from one rack to the other, substantially as described.

34. The combination with a plunger mechanism or the like, of a reciprocatory carriage for feeding material to said plunger, inwardly facing racks on said carriage, a gear segment rotating between said racks and engaging the same in alternation, means for actuating said segment by successive rotary impulses, and means for locking the carriage stationary during the passage of the segment from one rack to the other at each end of the carriage movement, substantially as described.

35. The combination with a plunger mechanism or the like, of a reciprocatory carriage for feeding material to said plunger, means for imparting a step by step movement to said carriage including a rotary part provided with a cam, and means for locking said carriage stationary at each end of its movement, comprising a movable pin, recesses in said carriage adapted to be engaged by the pin, a spring holding said pin normally projected toward the carriage, and connections arranged in the path of the cam for withdrawing the pin from one of said recesses at each end of the carriage movement, substantially as described.

36. The combination with a reciprocatory carriage, and means for moving said carriage alternately in opposite directions through a given path of movement, of an indicator arranged to be shifted at each end of the carriage movement to indicate the direction of the succeeding movement, substantially as described.

37. The combination with a reciprocatory carriage and means for moving said carriage alternately in opposite directions through a given path of movement, of an indicator movably mounted on the carriage and adapted to point in either direction, and means for moving said indicator at each end of the carriage movement to point in the direction of the succeeding carriage movement, substantially as described.

38. The combination with a reciprocatory carriage, and means for moving said carriage, of a sliding pin movably mounted on the carriage parallel with the direction of carriage movement, and a stationary stop at each end of the carriage movement adapted to strike and project the pin towards the opposite end of the carriage movement in each reciprocation of the latter, substantially as described.

39. In an envelop sealing and stamping machine, the combination with a magazine located on one side of a path of envelop movement, a stamp affixing mechanism located on the other side of said path of movement, and a transfer mechanism for carrying the envelops from the magazine to the stamp affixing mechanism, of means for moistening the flap of the envelop and folding the same thereof to the body of the envelop, located on the opposite side of the path of movement from the stamp affixing mechanism between the latter and the magazine, substantially as described.

40. In an envelop sealing and stamping machine, the combination with a magazine located on one side of a path of envelop movement, a stamp affixing mechanism located on the other side of said path of movement, and a transfer mechanism for carrying the envelops from the magazine to the stamp affixing mechanism, of means for moistening the stamp receiving face of the envelop, located in front of the magazine and acting against the bunch of envelops therein, and means for moistening the flap of the envelop and folding the same to the body of the envelop, located on the opposite side of the path of movement from the stamp affixing mechanism and between the latter and the magazine, substantially as described.

41. In a machine for sealing envelops, the combination with a magazine in which the envelops are arranged on edge with their flaps overlapping each other, of a moistening device consisting of a moistener located adjacent to one side of the magazine with its moistening surface substantially on a level with the overlapping envelop flaps and a guide plate located above the moistener leaving an intervening opening adapted to receive the flap of the foremost envelop when the latter is moved endwise out of the magazine, a transfer mechanism for thus moving the envelops in succession from the magazine and past the moistening device, and means for pressing the moistened flap against the body of the envelop, substantially as described.

42. In an envelop sealing machine, the combination with a transfer mechanism of means for moistening and turning down the flap against the body of the envelop, and a stacker mechanism for bunching the envelops and pressing the flap and body of each envelop firmly together, substantially as described.

43. In an envelop sealing machine the combination with a magazine for holding the unsealed envelops and with a transfer mechanism for carrying the envelops from the magazine, of means for moistening the envelops for sealing, means for turning down the flap against the body of each envelop, and a stacker to which the envelops are delivered by the transfer mechanism including means for bunching the envelops and compressing them to insure perfect sealing, substantially as described.

44. In an envelop sealing machine, the combination with a magazine for holding a pack of envelops, means for pressing the envelops forward in the magazine, a separator for separately advancing the foremost envelop in the magazine, and a transfer mechanism for transferring the separated envelops from the magazine to a stacker, of means for successively moistening the flaps of the separated envelops and folding the same to their bodies, and a stacker mechanism for assembling the envelops and firmly pressing them together to insure the perfect sealing of the same, substantially as described.

45. The combination with an envelop magazine, of a carrier mechanism for removing the envelops in succession from the magazine, means for affixing a stamp to the envelop during its transfer by the carrier mechanism, a stacker for receiving and bunching the transferred envelops, and means in the stacker for maintaining the bunched envelops under pressure, substantially as described.

46. The combination with a table upon which the envelops are supported on edge, of a presser for forcing the envelops forward upon the table, a stop on one side of the table between which and the presser the envelops are positively compressed at one end, a device on the opposite side of the table for temporarily checking the advance of the other end of the envelops, a separator for swinging each foremost envelop forward about the stop and past the checking device, and a carrier for pulling the advanced envelop from behind the stop and removing it from the table.

47. The combination of a rectilinearly movable carrier, of an envelop magazine extending transversely and at an angle to the line of carrier movement, a presser for forcing the envelops in the magazine toward said carrier, a stop between which and the presser the envelops are positively compressed at one end, a device for temporarily checking the advance of the other end of the envelops, and a separator for swinging the latter end of the foremost envelop separately past said checking device into position to be seized by the carrier and pulled from behind said stop.

48. The combination with flap-moistening devices, and a stamp affixer mechanism, of means for moving a plurality of envelops to and beyond the flap moistening devices and the stamp affixer mechanism successively, means for intermittently actuating the envelop-moving means with intervals of rest or dwell, and means for feeding envelops successively from a stack or pile to the envelop-moving means.

49. The combination of a magazine or carrier for containing a stack or pile of envelops, a feeder operable to discharge envelops successively from the stack or pile, suitable sealing devices, means for moving envelops from the feeder to the sealing devices, and a flap moistener arranged to act on the envelops at a point between the feeder and the sealing devices.

50. A machine for sealing and stamping envelops continuously, comprising an envelop carrier, means for feeding the envelops successively to said carrier, means for moistening and means for sealing the envelops, means for imparting movement to the carrier, and a stamp affixing mechanism in coöperative relation to the carrier, substantially as described.

51. A machine for sealing and stamping envelops continuously, comprising an envelop carrier for advancing the envelops by steps with an intervening period of rest or dwell, means for feeding envelops successively to said carrier, means for moistening and means for sealing the envelops, and a stamp affixing mechanism in coöperative relation to said carrier and acting to affix stamps to the envelops during their periods of rest or dwell, substantially as described.

52. A machine for sealing and stamping envelops continuously, comprising an envelop carrier, for advancing the envelop by steps with an intervening period of rest or dwell, a feed mechanism coöperating with said carrier, to supply envelops successively from a stack or pile, means for moistening and means for sealing the envelops, and a stamp affixing mechanism located at an intermediate point of the carrier and coöperating therewith to affix stamps to the envelops during their periods of rest or dwell, substantially as described.

53. A machine for sealing and stamping envelops continuously, comprising an envelop carrier for advancing the envelops by steps with an intervening period of rest or dwell, means for feeding envelops successively to said carrier, flap moistening devices, devices adjacent to said carrier for moistening the stamp faces of the envelops and devices for applying stamps thereto during their periods of rest or dwell, and pressure devices coöperating with said carrier to apply final pressure to the flaps and stamps, substantially as described.

54. A machine for stamping and sealing envelops, comprising a magazine adapted for containing a stack or pile of envelops, means for feeding envelops successively to a carrier from the stack or pile contained in said magazine, means for moistening and means for sealing the flaps of the envelops, a carrier means for moving the envelops in a substantially horizontal path one after the other from the feed devices to and beyond the moistening and sealing devices, and a stamp affixing mechanism adjacent to the path of feed of the envelop, substantially as described.

55. A machine for sealing and stamping envelops comprising a magazine for containing a stack or pile of envelops, means for feeding envelops successively from the stack or pile in the magazine, means for moistening the envelops, means for pressing the envelops to seal them means for moving the envelops in a substantially horizontal path one after the other from the feed devices to and beyond the moistening devices, and a stamp affixing mechanism adjacent to the path of movement of the envelop, substantially as described.

56. A machine for sealing and stamping envelops, comprising a magazine for containing a stack or pile of envelops, means for feeding envelops successively from the stack or pile in the magazine, means for moistening the envelops, means for pressing the envelops to seal them means for moving the envelops horizontally and by successive steps to and beyond the moistening devices, and a stamp affixing mechanism adjacent to the path of movement of the envelops for stamping the same during the periods of rest or dwell in the envelop movement, substantially as described.

57. The combination with a magazine for containing a stack of envelops, of a feeder for separating the envelops successively from the stack, means for subsequently moving the envelops along a predetermined plane of movement, means for moistening the envelops, means for pressing the envelops to seal them, and means for affixing stamps to the envelops prior to said pressing action, substantially as described.

58. The combination with a plunger mechanism, or the like, of a reciprocatory carriage provided with a supporting surface for sheet material, serrated feed wheels revolubly mounted in proximity to said surface, means for reciprocating the carriage step by step past the plunger, and means for imparting a rotary impulse to the feed wheels at each end of the carriage movement.

59. The combination with a stamp affixing mechanism, of a carriage provided with a surface for supporting a sheet of stamps, sharp toothed feed wheels revolubly mounted in proximity to said surface, and adapted to feed the sheet of stamps forward, means for moving the carriage step by step past the affixing mechanism and means for occasionally imparting a rotary impulse to the feed wheels to advance the sheet.

60. The combination with a stamp affixing mechanism, of a carriage provided with a surface for supporting a sheet of stamps, sharp toothed feed wheels revolubly mounted in proximity to said surface and adapted to feed the sheet of stamps forward, means for adjusting the toothed feed wheels in relation to the supporting surface, means for moving the carriage step by step past the affixing mechanism, and means for occasionally imparting a rotary impulse to the feed wheels to advance the sheet.

In testimony, that we claim the foregoing as our invention, we affix our signatures hereto, in the presence of two subscribing witnesses, this 17th day of Sept., 1898.

EDWARD C. MORRIS.
LOUIS J. HALL.

Witnesses:
HENRY W. CARTER,
RALPH PINKERTON.